United States Patent
Ren et al.

(10) Patent No.: US 12,326,515 B2
(45) Date of Patent: Jun. 10, 2025

(54) LINEAR CHIRP AUTOMOTIVE RADAR USING MILLIMETER WAVE METAMATERIAL ANTENNAS

(71) Applicant: NXP B.V., Eindhoven (NL)

(72) Inventors: Dongyin Ren, East Brunswick, NJ (US); Ryan Haoyun Wu, San Jose, CA (US); Satish Ravindran, Santa Clara, CA (US)

(73) Assignee: NXP B.V., Eindhove (NL)

( * ) Notice: Subject to any disclaimer, the term of this patent is extended or adjusted under 35 U.S.C. 154(b) by 566 days.

(21) Appl. No.: 17/685,668

(22) Filed: Mar. 3, 2022

(65) Prior Publication Data

US 2023/0280446 A1    Sep. 7, 2023

(51) Int. Cl.
*G01S 7/282* (2006.01)
*G01S 7/41* (2006.01)
*G01S 13/89* (2006.01)

(52) U.S. Cl.
CPC .............. *G01S 7/282* (2013.01); *G01S 7/414* (2013.01); *G01S 13/89* (2013.01)

(58) Field of Classification Search
None
See application file for complete search history.

(56) References Cited

U.S. PATENT DOCUMENTS

| | | |
|---|---|---|
| 7,956,799 B2 | 6/2011 | Spreadbury |
| 7,994,969 B2 | 8/2011 | Van Caekenberghe et al. |
| 10,942,256 B2 | 3/2021 | Achour et al. |
| 2018/0074180 A1 | 3/2018 | Wu et al. |

FOREIGN PATENT DOCUMENTS

WO    2008107825 A1    9/2008

OTHER PUBLICATIONS

Dongyin Ren et al., 1D & 2D W-band Frequency Scanning Metamaterial Antenna and Array, 2020 IEEE International Symposium on Antennas and Propagation and North American Radio Science Meeting, 2020, pp. 171-172, doi: 10.1109/IEEECONF35879.2020.9330124, Jul. 5-10, 2020.

(Continued)

*Primary Examiner* — Whitney Moore

(57) ABSTRACT

A linear chirp radar system, apparatus and method use a radar control processing unit to control an LFM radar front end which includes a frequency-scanning transmit antenna and a frequency-scanning receive antenna which respectively sweep a transmit and receive energy focus across an angle space with each linear chirp signal, where the radar control processing unit processes digital output signals generated from target return signals received in response to transmitted linear chirp signals and extracts target range-angle information by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment.

18 Claims, 10 Drawing Sheets

(56) References Cited

OTHER PUBLICATIONS

Thomas Geibig et al., Compact 3D Imaging Radar Based on FMCW Driven Frequency-Scanning Antennas, 2016 IEEE Radar Conference (RadarConf), 2016, pp. 1-5, doi: 10.1109/RADAR.2016.7485168, May 2-6, 2016.
Yuri Alvarez Lopez et al., Frequency Scanning Based Radar System, Progress in Electromagnetics Research, vol. 132, 275-296, Sep. 2012.
Yuri Alvarez et al., Submillimeter-Wave Frequency Scanning System for Imaging Applications, IEEE Transactions on Antennas and Propagation, vol. 61, No. 11, pp. 5689-5696, Nov. 2013.

LINEAR CHIRP AUTOMOTIVE RADAR USING MILLIMETER WAVE METAMATERIAL ANTENNAS

BACKGROUND OF THE INVENTION

Field of the Invention

The present invention is directed in general to radar systems and associated methods of operation. In one aspect, the present invention relates to an automotive radar system which uses transmit and receive antennas and associated methods of operation.

Description of the Related Art

To improve the safety of vehicle and passengers, Advanced Driver Assistance Systems (ADAS) systems use radar-based detection to provide reliable and accurate details of a vehicle's surroundings and to assist drivers to sense the on-road potential hazards in case of blocked vision or poor visibility conditions. ADAS radars operate by transmitting or radiating signals from transmitting antennas on a vehicle so that, when the transmitted radar signal hits a target and is reflected back to the vehicle, the target return signal is received by a radar front-end (FE) unit and processed by a radar controller processing unit. For improved automotive safety, high-quality angular information is required from automotive radars, but the system cost and complexity scale exponentially with angular performance, prohibiting wider adoptions of such radars. A significant cost and complexity driver is that existing radars require a large number of transmitters (TX) and receivers (RX) to measure or resolve target angle, range, and velocity. In particular, such multi-transmitter and multi-receiver systems will generate radiation pattern of a transmit antenna array by controlling the phase and amplitude of the multiple transmit antenna/excitation sources to generate multiple radar transmit signals, and then use beam forming techniques process the target returns signals to form of a large directional antenna shape by combining propagation signals from arrangement of small nondirectional antennas. While there are radar systems that achieve angular resolution performance using only a single transmit antenna and single receive antenna, such radar systems typically require an expensive and cumbersome mechanically-steered rotating antennas or electronically-steered beamforming phased array wherein each antenna element is fitted with active phase rotating and amplification devices, thereby increasing the overall system size, weight, power requirements, and costs. As a result, existing radar systems are extremely difficult at a practical level by virtue of the balancing performance, complexity, and cost requirements of providing multiple radar transmit and receive antennas which can generate radiation patterns and receive resulting target return signals that directly translate to real-world range coverage requirements in a compact and cost-effective way.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A linear chirp automotive radar system, apparatus, and methodology are described for obtaining high-quality angular information on one or more targets by using a single transmit antenna and receive antenna, each formed with frequency scanning antennas that are configured for directional beam steering by sweeping the transmit/receive energy focus across an angle space with each transmitted chirp. In selected embodiments, the transmit and receive antennas are provided as low cost, low loss millimeter wave metamaterial antennas which may each be embodied as a stripline-based composite right/left-handed leaky wave antenna. By using a single millimeter wave metamaterial antenna at the transmitter and receiver, a target return from a transmitted frequency-modulated continuous wave (FMCW) radar chirp signal can be mapped to distinct range and azimuthal angles with respect to chirp frequencies by using a group delay-compensated time-frequency analysis on each received chirp. In selected embodiments, the target return signal processing may include performing a time-frequency analysis (e.g., a short-time Fourier transform) on digital samples of the receive and de-ramp-mixed chirp signals to extract raw range and angle information, followed by applying a group-delay compensation step to recover the target's range and disambiguated angle information from a single chirp. In addition, processing of the target return can extract Doppler information across multiple chirps.

Figure 1:
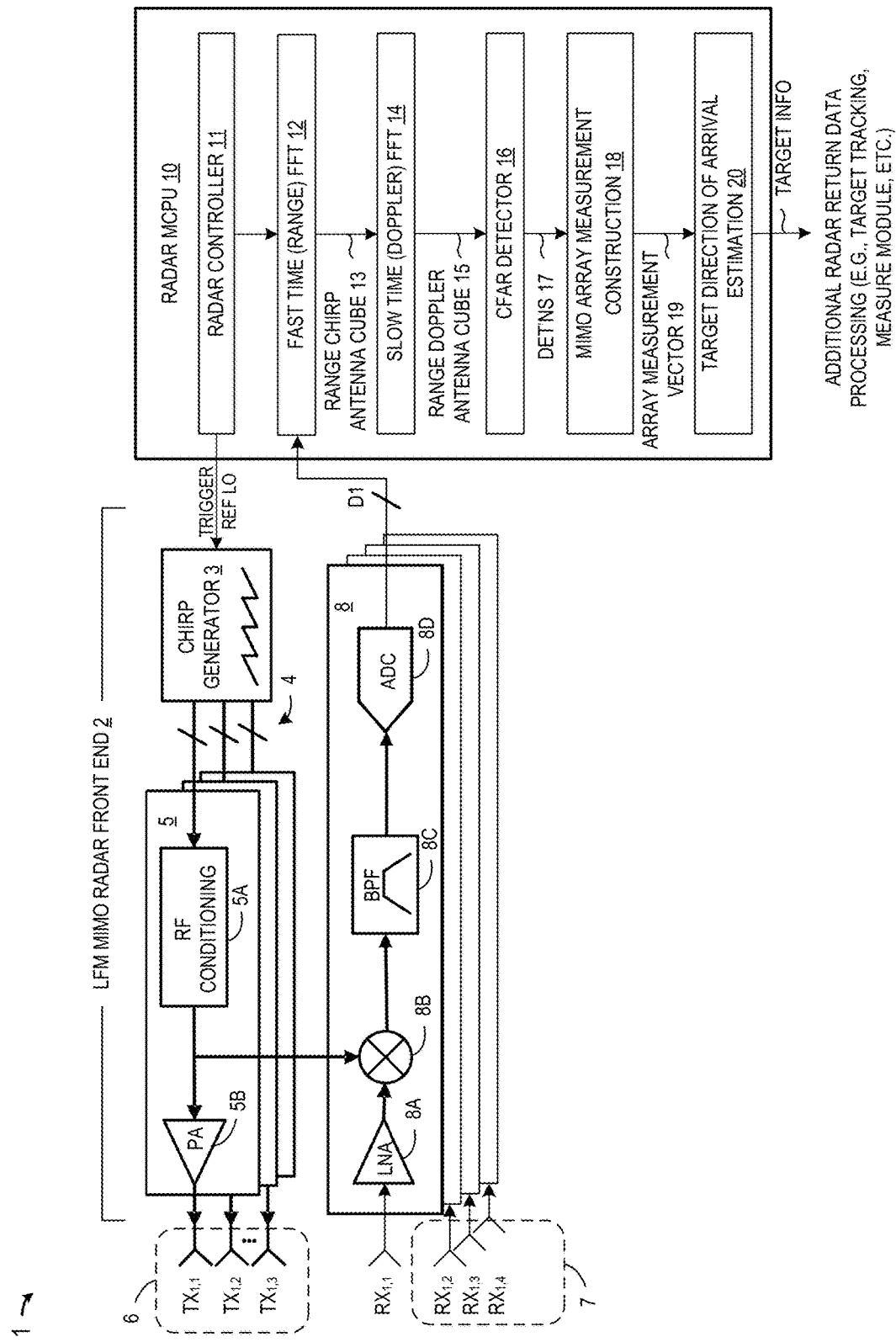
FIG. 1 is a simplified schematic block diagram of a conventional LFM MIMO automotive radar system.

By way of background to the present disclosure, reference is now made to FIG. 1 which depicts a simplified schematic block diagram of an automotive radar system 1 which includes one or more distributed a Linear Frequency Modulation (LFM) multiple-input, multiple output (MIMO) automotive radar front-end devices 2 connected between a radar microcontroller processing unit (MCPU) 10 and a transmit antenna array 6. Each distributed LFM MIMO radar front-end device 2 includes a plurality of transmitting antenna elements 6 $TX_i$ and receiving antenna elements 7 $RX_j$ connected, respectively, to one or more radio-frequency (RF) transmitter (TX) units 5 and receiver (RX) units 8. For example, the LFM MIMO radar front-end device 2 is shown as including individual antenna elements (e.g., $TX_{1,i}$, $RX_{1,j}$) connected, respectively, to three transmitter modules (e.g., 5) and four receiver modules (e.g., 8), but these numbers are not limiting and other numbers are also possible. Each radar front-end device 2 also includes a chirp generator 3 which is configured and connected to supply a chirp input signal 4 to the transmitter module(s) 5. To this end, the chirp generator 3 is connected to receive an independent local oscillator (LO) signal and a chirp start trigger signal from the radar MCPU 10. Chirp signals 4 are generated and transmitted to multiple transmitters 5 usually following a pre-defined transmission schedule, where they are filtered at the RF conditioning module 5A and amplified at the power amplifier 5B before being fed to the corresponding transmit antenna $TX_{1,i}$ 6 and radiated. Transmitter elements 6 can operate on time-division, frequency-division, Doppler-division, code-division or other MIMO multiplexing fashion.

The radar system 1 also includes the radar MCPU 10 that is connected to supply input control signals to the radar device 2 and to receive therefrom digital output signals D1 generated by the receiver modules 8. In selected embodiments, the radar MCPU 10 may be embodied as a microcontroller unit (MCU) or other processing unit that is configured and arranged for signal processing tasks such as, but not limited to, target identification, computation of target distance, target velocity, and target direction, and generating control signals. The radar MCPU 10 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar MCPU 10 may be configured to program the transmitter modules 5 to operate in a time-division, frequency-division, Doppler-division, code-division or other multiplexing fashion by transmitting LFM chirps for coordinated communication between the transmit antennas $TX_{1,i}$, $RX_{1,j}$.

In the example shown, each chirp generator 3 generates a chirp signal 4 in response to a chirp start trigger signal and a corresponding reference local oscillator signal (Reference LO) generated by the radar controller 11. The resulting chirp signal 4 from each chirp generator 3 is then processed by the RF conditioning unit 5A and amplified at the power amplifier (PA) 5B which amplifies the signal to a level suitable for transmission as a radar signal by a transmitter antenna unit $TX_{1,i}$. Though not shown, it will be understood that the transmitter module 5 may include additional processing circuits, such as a digital-to-analog converter (DAC), phase shifter (or phase rotator), buffer, mixer, filter, and the like.

The radar signal transmitted by the transmitter antenna unit $TX_{1,i}$ may be reflected by one or more objects (not shown), and part of the reflected radar signal reaches the receiver antenna units $RX_{1,j}$ at the LFM MIMO radar front-end device 2. At each receiver module 8, the received (radio frequency) antenna signal is amplified by a low noise amplifier (LNA) 8A and then fed to a mixer 8B where it is mixed with the transmitted chirp signal generated by the RF conditioning unit 5A. The resulting intermediate frequency signal is fed to a band-pass filter (BPF) 8C and may also be amplified and/or filtered with additional receive processing elements (not shown) before being fed to an analog/digital converter (ADC) 8D and output by each receiver module 8 as a digital signal D1.

At the radar MCPU 10, the digital signal D1 is processed by the radar modules 12-20 to detect and measure target returns. For example, the digital output signals D1 may be processed by one or more fast Fourier transform (FFT) modules, such as a fast-time (range) FFT module 12 and slow-time (Doppler) FFT module 14, thereby generating, respectively, a three-dimensional range-chirp cube 13 and range-Doppler antenna cube 15. In turn, the Fourier-transformed outputs 15 are then passed through one or more constant false alarm rate (CFAR) detector modules 16 to obtain the range-Doppler peak detections 17 which are processed by the MIMO array measurement construction module 18 to construct array measurement vectors 19 for use by the target direction of arrival estimation module 20 to estimate the direction of arrival for the target return(s). In addition, there are one or more additional radar return data processing steps that may be performed, such as target tracking processing and measurement processing, with the result being output to other automotive computing or user interfacing devices for further process or display.

For automotive radar systems where mechanical rotation of the transmit and receive antenna arrays is not allowed, the field-of-view (FOV) and the range coverage pattern are highly dependent on the pre-designed radiation pattern of the transmit and receive antenna/arrays 6, 7. One commonly-used technique to control the radiation pattern is to use digital beamforming to steer the beam electronically to cover a wider FOV. However, such beamforming techniques require multiple transmitting channels/antennas and/or external phase shifters, thereby increasing the system cost and complexity. An alternative low-cost solution is to use wide a FOV antenna element that covers a wide angular range without focusing on a particular direction. In this case, the angular position can be further resolved by using multiple TXs/RXs. With either the electronical beamforming/steering technology or wide FOV antenna-based solutions, it will be appreciated that there are additional costs required if both the angle of arrival and wide FOV are needed, as is the case with next-generation ADAS and autonomous driving (AD) systems to ensure safe driving/riding for the driver and passengers.

To address these deficiencies from conventional approaches and others known to those skilled in the art, there is disclosed herein a method, system, and apparatus for using a single frequency-scanning transmit antenna and single frequency-scanning receive antenna to provide a cost-effective solution to achieve high angular resolution and wide FOV at a minimum cost and without using active components in antenna structure. The frequency-scanning transmit and receive antennas may each be implemented as low cost, low loss millimeter wave metamaterial antennas by using a stripline-based composite right/left-handed leaky wave antenna. By using millimeter wave metamaterial antenna at the transmitter and receiver, target returns from transmitted frequency-modulated continuous wave (FMCW) radar chirp signals can be mapped to distinct range and azimuthal angles by performing a chirp-sweeping processing method which uses a group delay-compensated time-frequency analysis on each received chirp.

Figure 2:
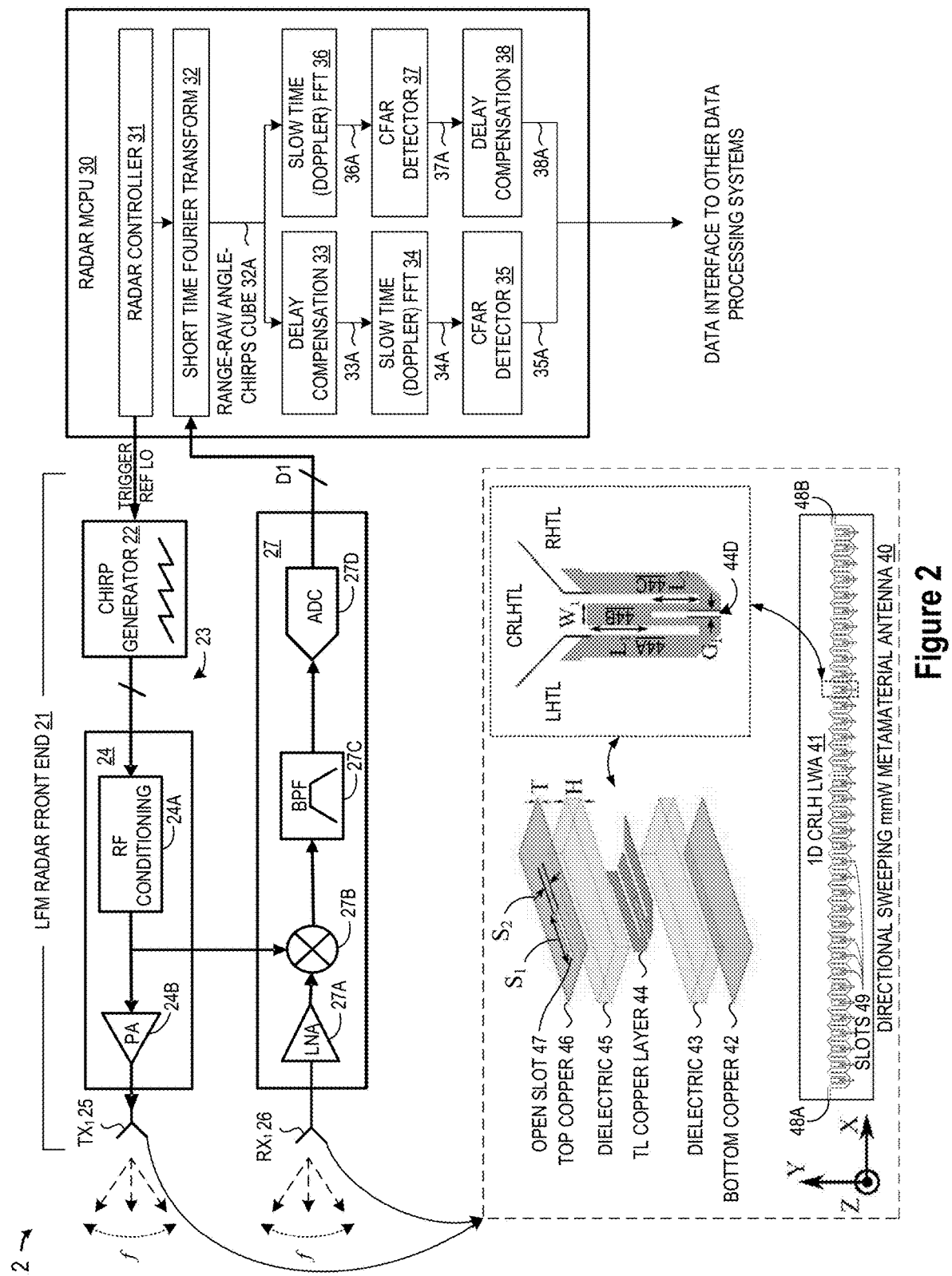
FIG. 2 is a simplified schematic block diagram of an LFM automotive radar system which uses directional sweeping transmit and receive mmW metamaterial antennas in combination with group delay compensation techniques in accordance with selected embodiments of the present disclosure.

To provide additional details for an improved contextual understanding of the selected embodiments of the present disclosure, reference is now made to FIG. 2 which depicts a simplified schematic block diagram of an automotive radar system 2 which includes an LFM automotive radar front-end device 21 connected between a radar microcontroller processing unit (MCPU) 30 and a directional sweeping transmit antenna array 25 in accordance with selected embodiments of the present disclosure. In selected embodiments, the LFM radar front-end device 21 may be embodied as a line-replaceable unit (LRU) or modular component that is designed to be replaced quickly at an operating location. Similarly, the radar MCPU 30 may be embodied as a line-replaceable unit (LRU) or modular component. While a single LFM radar front-end device 21 is shown, any desired number of LFM radar front-end devices 21 may be used in embodiments employing a MIMO signaling techniques. In addition, the depicted radar system 2 may be implemented in integrated circuit form with the LFM radar front-end device(s) 21 and the radar controller processor 30 formed with separate integrated circuits (chips) or with a single chip, depending on the application.

Each LFM radar front-end device 21 includes at least a first transmitting antenna element $TX_1$ and at least one receiving antenna element $RX_1$ connected, respectively, to the radio-frequency (RF) transmitter (TX) unit 24 and receiver (RX) unit 27. Each radar LFM radar front-end device 21 also includes a chirp generator 22 which is configured and connected to supply a chirp input signal 23 to the transmitter module(s) 24. To this end, the chirp generator 22 is connected to receive a separate and independent local oscillator (LO) signal and a chirp start trigger signal generated by the radar controller 31. Chirp signals 23 are generated and transmitted to the transmitter unit 24 where it is filtered at the RF conditioning module 24A and amplified at the power amplifier 24B before being fed to the transmit antenna $TX_1$ 25 and radiated.

The radar system 2 also includes the radar MCPU 30 that is connected to supply input control signals to the radar front-end device 21 and to receive therefrom digital output signals D1 generated by the receiver module 27. In selected embodiments, the radar MCPU 30 may be embodied as a micro-controller unit (MCU) or other processing unit that is configured and arranged for signal processing tasks such as, but not limited to, target identification, computation of target distance, target velocity, and target direction, and generating control signals. The radar MCPU 30 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar MCPU 30 may be configured to program the transmitter module 24 to operate by transmitting LFM chirps for communication between the transmit antennas $TX_1$, $RX_1$.

The radar signal transmitted by the transmitter antenna unit $TX_1$ may be reflected by one or more objects (not shown), and part of the reflected radar signal reaches the receiver antenna units $RX_1$ at the LFM radar front-end device 21. At each receiver module 27, the received (radio frequency) antenna signal is amplified by a low noise amplifier (LNA) 27A and then fed to a mixer 27B where it is mixed with the transmitted chirp signal generated by the RF conditioning unit 24A. The resulting intermediate frequency signal is fed to a band-pass filter (BPF) 27C and may also be amplified and/or filtered with additional receive processing elements (not shown) before being fed to an analog/digital converter (ADC) 27D and output by each receiver module 27 as a digital signal D1.

To enable cost-effective and accurate acquisition of Range-Angle-Doppler information using a single frequency-scanning transmit antenna 25 and single frequency-scanning receive antenna 26, the transmit and receive antennas 24, 25 may each be implemented with a passive directional frequency sweeping antenna, such as the mmW metamaterial antenna array structure 40. As depicted, the directional frequency sweeping transmit/receive antenna array structure 40 may be implemented with a compact antenna array configuration and feeding network design which includes a stacked arrangement of a first bottom copper layer 42, an insulating substrate dielectric layer 43, a transmission line (TL) copper layer 44 in which a composite right/left-handed (CRLH) leaky wave antenna (LWA) element is formed, an insulating superstrate dielectric layer 45, and a top copper layer 46 which includes a plurality of open slots 47 which are aligned with slots formed in the CRLH LWA element 44. In this stacked arrangement, the directional frequency sweeping mmW metamaterial antenna array structure 40 provides a low-cost, low-loss antenna solution to the W-band beam steering application by delivering positive, zero, and negative phase progression from 76 GHz to 81 GHz, thereby ensuring the backward (−28°) to forward (23°) fan beam frequency scanning when CRLH unit cells are periodically cascaded to form a 1D CRLH LWA 41.

In an example embodiment, the directional frequency sweeping transmit/receive antenna array structure 40 may use any suitable design for the CRLH LWA element formed in the TL copper layer 44. For example, a "W" shaped patterned copper layer may be used to form the CRLH LWA element 44A-D, including a left-handed (LH) transmission line (TL) 44A and right-handed (RH) transmission line 44C formed at opposite sides of a central radiator LH TL element 44B. The LHTL 44A and RHTL 44C at the two ends provide the series inductance ($L_R$) and shunt capacitance ($C_R$). In addition, the central radiator LH TL element 44B is connected to the LHTL 44A and RHTL 44C at a bottom region in which a narrow slot 44D is formed in alignment with the open slot 47 in the top copper layer 46. In this way, the narrow gap/slot 44D, 47 in the middle/top layers and the lines connecting to the virtual ground pad provide the series capacitance ($C_L$) and shunt inductance ($L_L$), respectively. In an example embodiment, the open slot 47 in the top copper layer 46 has a first slot length dimension (e.g., $S_1$=1.1 mm) and a first slot width dimension (e.g., $S_2$=0.14 mm). In addition, the central radiator LH TL element 44B has a slot 44D with a second, smaller gap width dimension (e.g., $G_1$=0.1 mm). The central radiator LH TL element 44B also has a first width dimension (e.g., $W_1$=0.3 mm) and a first combined length dimension $L_1+L_2$, where $L_1$ is the length of the portion of the CRLHTL 44B that does not include the slot 44D (e.g., $L_1$=0.92 mm), and where $L_2$ is the length of the narrow slot 44D (e.g., $L_2$=0.7126 mm). While any suitable number of antenna array structures 40 may be used to form the 1D CRLH LWA 41, in selected embodiments, 36 CRLH LWA element 44A-D may be periodically cascaded to form the 1D CRLH LWA 41 having defined width and length dimensions (e.g., 5.1 cm×4.4 mm, including ground plane area). However, it will be appreciated that other dimensions for the elements and slots of the directional frequency sweeping transmit/receive antenna array structure 40 can be used. In addition, the number and shape of the radiator elements can also be modified based on the desired radiation pattern, depending on the designed radiation pattern coverage.

As indicated above, the transmit and receive antennas 24, 25 are not confined to the directional frequency sweeping mmW metamaterial antenna structure 40 shown in FIG. 2, and may use any suitable directional frequency sweeping metamaterial antenna design. As will be appreciated, metamaterial antennas are a class of antennas which use metamaterials to increase performance of miniaturized (electrically small) antenna systems, and they often incorporates materials engineered with microscopic structures to produce unusual physical properties, such as increasing the antenna's radiated power or direction. To illustrate more broadly the required directional frequency sweeping behaviour of the transmit/receive antenna $TX_1$, $RX_1$, reference is now made to FIG. 3 which schematically depicts a metamaterial leaky wave antenna (LWA) 301 that is formed with a plurality of LWA elements (e.g., 302) to illustrate the dispersion relationship between the frequency $f_i$ and propagation constant $\beta$ and the corresponding radiation direction of the metamaterial LWA 301. By forming the metamaterial LWA 301A with metamaterial antenna elements (e.g., 302) having a propagation constant beta ($\beta$), an incident wave experiences a progressive phase shift $\beta x$ along the antenna radiating structure, where x is the antenna unit cell length. This phase shift can be controlled based on the operating frequency which is provided as $\beta$ control input. As a result of the phase shift, the radiation beam of the incident wave can be steered to backward, broadside and forward directions which corresponds to negative, zero and positive propagation constant ($\beta$) or phase progression ($\beta x$), respectively. As will be appreciated, the metamaterial antenna element 302 is not a new type of material, but is an engineered structure of metal and dielectric layers which provides the dispersion relation ($\beta$ vs frequency) as described herein.

Figure 3:
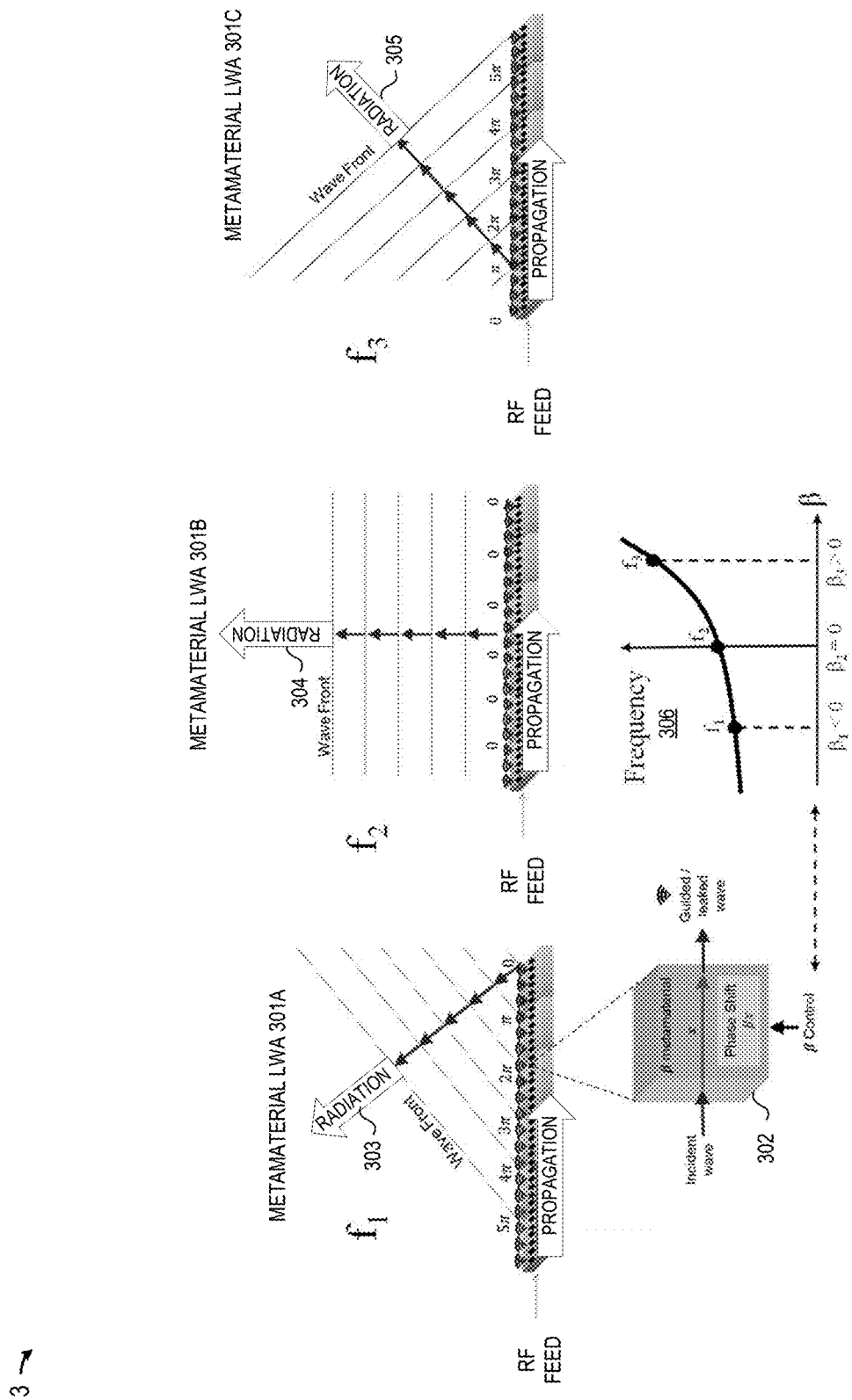
FIG. 3 schematically illustrates the dispersion relationship between the frequency and propagation constant of a mmW metamaterial antenna and the corresponding radiation direction.

To illustrate how different operating frequencies lead to different beam steering directions, FIG. 3 shows a metamaterial LWA 301A that is formed with antenna elements (e.g., 302) and that has a first, lower operating frequency $f_1$ will have a first, negative $\beta$ value, thereby steering or directing the wavefront 303 to the left or backward (e.g., $-\theta°$). In similar fashion, the metamaterial LWA 301B that is formed with antenna elements and that has a second, intermediate operating frequency $f_2$ will have a second, zero $\beta$ value, thereby steering or directing the wavefront 304 to be broadside (e.g., 0°). And the metamaterial LWA 301C that is formed with antenna elements and that has a third, higher operating frequency $f_3$ will have a third, positive $\beta$ value, thereby steering or directing the wavefront 305 to the right or forward (e.g., $+\theta°$).

Referring back to FIG. 2, the depicted directional frequency sweeping transmit/receive antenna array structure 40 can generate radiation patterns at six different frequencies, spanning from 76 GHz to 81 GHz, that are suitable for automotive radar applications. The frequency-dependent backward-to-forward scanning and beam steering nature of the designed antenna can be obtained by constructing the antenna to follow PCB designs using common dielectric substrates (e.g., RO3003) to form the dielectric layers 43, 45, and using copper to form the layers 42, 44, 46, thereby providing a low complexity, low-cost antenna design. In this design, the scanning FOV and steering direction can be further adjusted by adjusting the dimensions of the structural element 44. The radiation is achieved via a single feeding port 48A, 48B on each end of the antenna array 41 which is aligned to radiate through the open slots 49 in the top copper layer, which is different from conventional phased array approach in which an array of antennas is required, and each antenna requires an individual feed and active phase shifting device. In this design, each operating frequency corresponds to a particular beam steering angle which follows a quasi-linear relationship that corresponds to the ($\beta$ vs. frequency) dispersion property 306 of the metamaterial antenna. As will be appreciated, exact mapping is obtained from careful antenna pattern measurement and calibration. When a linear chirp signal is used to provide the RF feed input signal, the frequency-dependent angle is then mapped to time following the time-frequency relationship of the linear chirp.

As will be appreciated, the frequency scanning waveform of the transmitted chirp signals emitted from the directional frequency sweeping transmit/receive antenna array structure 40 requires that the radar MCPU 30 process the received digital signal D1 with a chirp-sweeping (CS) processing modules to detect and measure the target range, angle, and velocity from target returns. Each of the CS processing module sequence embodiments disclosed herein is much simpler compared to conventional FMCW processing module/steps 12-20 shown in FIG. 1. In particular, the disclosed CS processing module sequences include an initial short time Fourier transform (STFT) step or module 32 which acquires the Range-Angle map 32A that includes range and raw angle data in one step. In contrast, conventional FMCW radar systems process target returns with fast-time FFT algorithms to extract range data and with and additional algorithms (e.g., slow time FFT, Music, etc.) to extract direction of arrival (DoA) data. More importantly, the disclosed CS processing module sequences are able to extract range and angle data by processing a received chirp signal using as few as one transmit and receive mmWave metamaterial-based frequency scanning antenna design.

For the proposed mmWave metamaterial linear-chirp radar, a sequence of linear chirps will be transmitted from each metamaterial transmit antenna (e.g., $TX_1$ 25). For example, a transmitted linear chirp with an up-ramping frequency will have an instantaneous frequency $f_i$ that proportionally increases (e.g., from $f_1$ to $f_3$) along with the time of chirp signal. In response to the sweeping frequency, the radiation angle ($\theta$) of the radar transmit signal emitted from transmit antenna $TX_1$ 25 will steer from one end of the FOV to the other in response to the changing unit-length phase progression as dictated by the dispersive nature of the metamaterial antenna. Upon reception of the target return signal, a similar metamaterial receive antenna (e.g., $RX_1$ 26) is employed, resulting in an identical frequency-mapping antenna gain pattern that is steered by the arriving signal's instantaneous frequency. In this way, the radar system uses the linear chirp signal to map the transmit time to signal frequency in a linear fashion. And by using the frequency-scanning metamaterial antenna aperture, the radar system further maps the signal frequency to a radiation angle. Upon reception of the target return signal, the radar system performs time-frequency analysis on the received and deramp-mixed chirp signals (D1) to produce a spectrogram in which the frequency of reflected signal is made observable over time so that the target range, angle, and velocity can be calculated using the disclosed CS processing module sequences.

In a first example CS processing module sequence, the digital output signal D1 generated from a single linear chirp may be processed at the radar MCPU 30 with the short-time Fourier transform (STFT) module 32 to recover the target range information from the frequency component of the signal and to recover the raw target angle information from the time of arrival of observed signal. The resulting STFT output 32A may be generated as a range-raw angle-chirps cube. In order to correct the raw target angle information, the STFT output 32A may be processed by the delay compensation module 33 which processes the STFT output 32A to recover the corrected target angle from the time of arrival of observed signal by removing the target's round-trip delay as described more fully below. The resulting delay compensation output 33A may be generated as a corrected range-angle-chirps cube. In order to extract the target velocity information, the resulting delay compensation output 33A may be processed by the slow-time Fourier transform module 34 which recovers the target's velocity or Doppler information by observing the phase variation of an observed signal over the length of multiple chirps. The resulting slow time FFT output 34A may be generated as a range-Doppler-angle cube that is processed by the CFAR detector module 35 to identify the range-Doppler-angle peak detections 35A which may be forwarded as target information to the data interface for other data processing systems. In this way, the target range, angle, and velocity information may be extracted from a single frequency scanning radar transmit and receive antenna without requiring the construction of a MIMO array or the direction of arrival computation processing required by RMCW MIMO radar systems.

In another, more computationally-efficient CS processing module sequence, the digital output signal D1 is processed with the short-time Fourier transform (STFT) module 32 to recover and output the target range information and the raw target angle information as STFT output 32A, but instead of applying the delay compensation correctional computations to the entirety of the range-raw angle-chirps cube 32A, the STFT output 32A may first be processed by the slow-time Fourier transform module 36 which recovers the target's velocity or Doppler information by observing the phase variation of an observed signal over the length of multiple chirps. The resulting slow time FFT output 36A may be generated as a range-raw angle-Doppler cube. In order to reduce the amount of delay compensation calculations, the slow time FFT output 36A may be processed by the CFAR detector module 37 to detect the peak range-raw angle-Doppler peaks or bins 37A which may be forwarded to the delay compensation module 38 which processes the CFAR detector output 37A to recover the corrected target angle from the time of arrival of observed signal by removing the target's round-trip delay as described more fully below. The resulting delay compensation output 38A may be generated as a corrected range-angle-Doppler cube which may be forwarded as target information to the data interface for other data processing systems. Again, the computationally-efficient CS processing module sequence 36-38 extracts the target range, angle, and velocity information from a single frequency scanning radar transmit and receive antenna without requiring the construction of a MIMO array or the direction of arrival computation processing required by FMCW MIMO radar systems.

Figure 4:
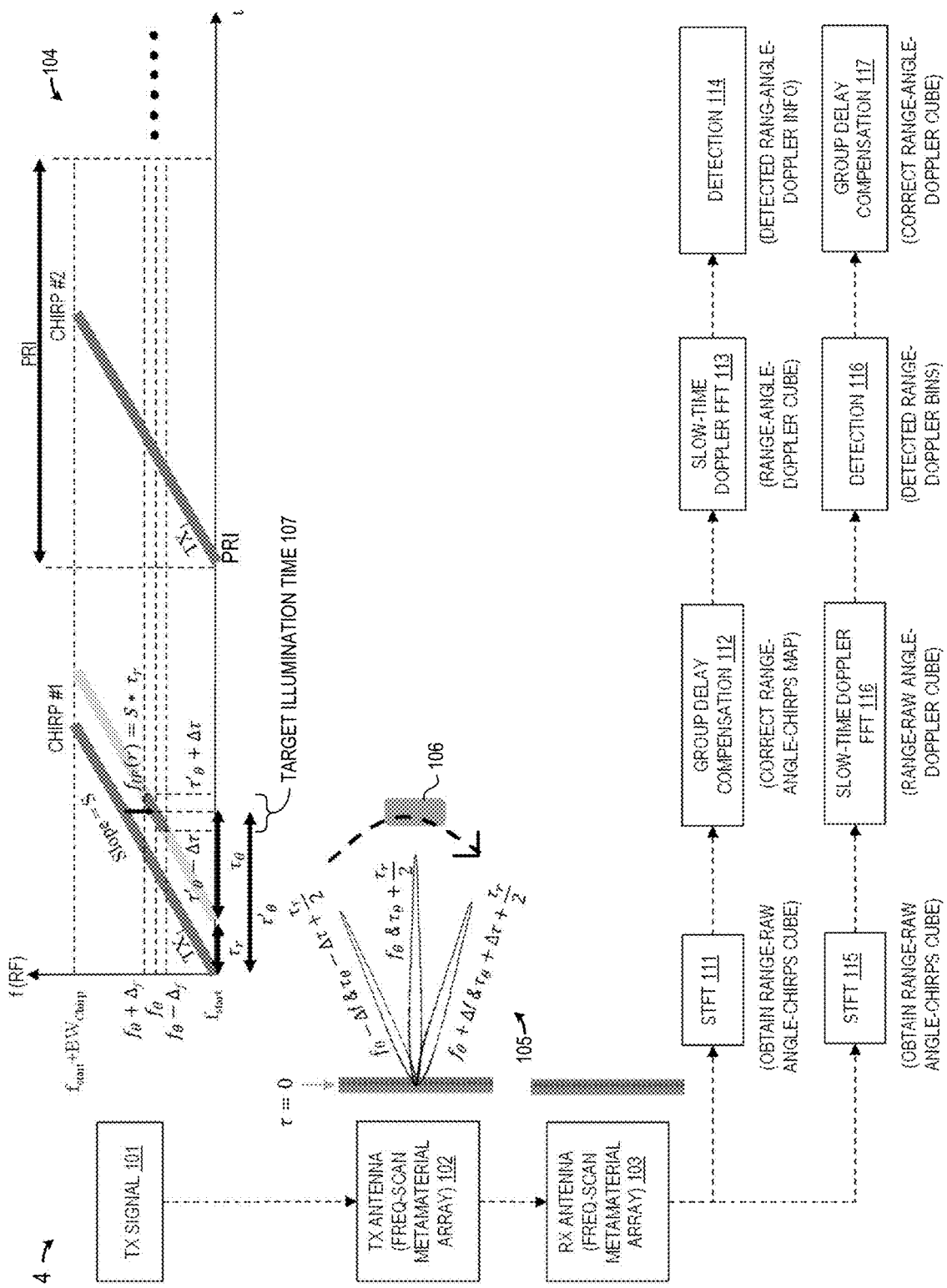
FIG. 4 is a conceptual schematic block diagram of the transmit, receive, and chirp-sweeping signal processing steps to illustrate different group delay compensation techniques in accordance with selected embodiments of the present disclosure.

For an improved understanding of selected embodiments of the present disclosure, reference is now made to FIG. 4 which is a conceptual schematic block diagram 4 of the transmit, receive, and chirp-sweeping signal processing steps performed at an LFM radar system to illustrate different group delay compensation techniques in accordance with selected embodiments of the present disclosure. As illustrated, the radar system includes a transmit antenna 102 and a receive antenna 103, each of which is embodied as a frequency-scanning metamaterial antenna array. In addition, an example target 106 is shown as being located in the vicinity radar system. In the depicted example, the transmit signal 101 is generated as a sequence of linear chirps 104 that is supplied to the transmit antenna 102.

Based on the changing frequency of each linear chirp signal (e.g., CHIRP #1) in the transmit signal 101, the radiation beam 105 generated by the transmit antenna 102 is steered from one (upper) end of the FOV to the other (lower) end in response to the linear ramping frequency having slope S from the beginning to the end of each linear chirp signal (e.g., CHIRP #1). As the beam 105 is steered from one end to the other, the target 106 is illuminated during a target illumination time 107 between time $$\tau_\theta + \frac{\tau_r}{2} - \Delta\tau \text{ and } \tau_\theta + \frac{\tau_r}{2} - \Delta\tau$$

and with an illuminated frequency between $f_\theta - \Delta f$ and $f_\theta + \Delta f$, where $$\tau_\theta + \frac{\tau_r}{2}$$

represents the time the illumination is at its peak, where $\Delta\tau$ represents the difference between the time the target 106 is first made observable (e.g., upon first reaching the minimum detection SNR) and the time the illumination is at its peak, and where $\Delta f$ corresponds to the amount of frequency ramp within $\Delta\tau$. Since the target 106 reflects the transmitted chirp only while it is significantly illuminated, the target return received at the receive antenna 103 receives only the reflected portion of the transmitted chirp 104 which is between time $\tau'_\theta - \Delta\tau$ and $\tau'_\theta + \Delta\tau$, where $\tau'_\theta = \tau_\theta + \tau_r$, and $\tau_r$ is round-trip propagation time of the target echo.

As will be appreciated, the reflected portion of the linear chirp signal is mixed at the receiver with the transmitted chirp to produce a sinusoidal tone whose tone frequency $f_{IF}$ corresponds to the product of the round-trip propagation time ($\tau_r$) and the slope of the linear chirp (S) (e.g., $f_{IF} = \tau_r \times S$). As a result, by observing the frequency of the observed transient tone signal (e.g., $f_{IF}$) in the spectrogram, the round-trip propagation time ($\tau_r$) can be estimated based on the slope (S). In addition, by locating the peak of the amplitudes of the transient tone signal in the spectrogram, the total or uncorrected peak illumination time ($\tau'_\theta$) can be obtained. In turn, the actual or corrected peak of illumination time ($\tau_\theta$) can be estimated as $\tau_\theta = \tau'_\theta - \tau_r$. As a result, the target's angle can be obtained via the known functional mapping between the transmitted time/frequencies and the beam steering angles. Since the tone frequency (i.e., the deramp mixer output, also known as the intermediate frequency (IF) $f_{IF}$ is linearly proportional to the amount of delay from the round-trip propagation ($\tau_r$), it can be viewed as a "group delay" effect. As a result, the process of removing $\tau_r$ from $\tau'_\theta$ is generally referred to as a group delay compensation process.

As seen from the depicted radiation beam 105, the portion of the illuminated frequency range when the target 106 is illuminated spans a bandwidth of 2Δf, where Δf=Δτ×Chirp Rate (S). Thus, 2Δf corresponds to the minimum SNR bandwidth, and is inversely proportional to the range resolution. As a result, a larger SNR target value has a larger bandwidth 2Δf. In addition, a larger cross-range extent target has a larger beamwidth. And a larger beamwidth leads to a larger bandwidth which leads to finer range resolution.

Upon reception at the receive antenna 103, the received target return linear chirp signal is mixed with the transmitted chirp and digitally sampled (e.g., with an analog-to-digital converter). The resulting digital signal may then be processed with chirp-sweeping (CS) signal processing steps to extract the target range, angle, and velocity information. In a first CS signal processing sequence, a short-time Fourier transform (STFT) processing step 111 is applied to the sampled digital signal to produce a spectrogram which may be provided as a range-raw angle-chirps cube. On the STFT output, a group delay compensation processing step 112 may be applied to output a correct range-angle-chirps map. On the group delay compensation output, a slow-time Doppler FFT processing step 113 is applied to produce a range-angle-Doppler cube which is processed by the CFAR detection processing step 114 to detect peak range-angle-Doppler information. In a second CS signal processing sequence, a short-time Fourier transform (STFT) processing step 115 is applied to the sampled digital signal to produce a spectrogram which may be provided as a range-raw angle-chirps cube. On the STFT output, a slow-time Doppler FFT processing step 116 is applied to produce a range-raw angle-Doppler cube. On the slow time Doppler FFT output, a CFAR detection processing step 117 is applied to detect range-Doppler bins for peak target detections. Finally, a group delay compensation processing step 118 may be applied to only the detected peaks to output a correct range-angle-Doppler cube. Thus, the first CS signal processing sequence 111-114 applies the group delay compensation processing 112 to the entirety of the range-raw angle-chirps cube generated by the STFT processing step 111 as may be appropriate when there are not computational resource constraints. However, in the second CS signal processing sequence 115-118, the group delay compensation processing step 118 is applied after using the CFAR detection step 117 to detect peak detections, thereby saving computational resources.

Figure 5:
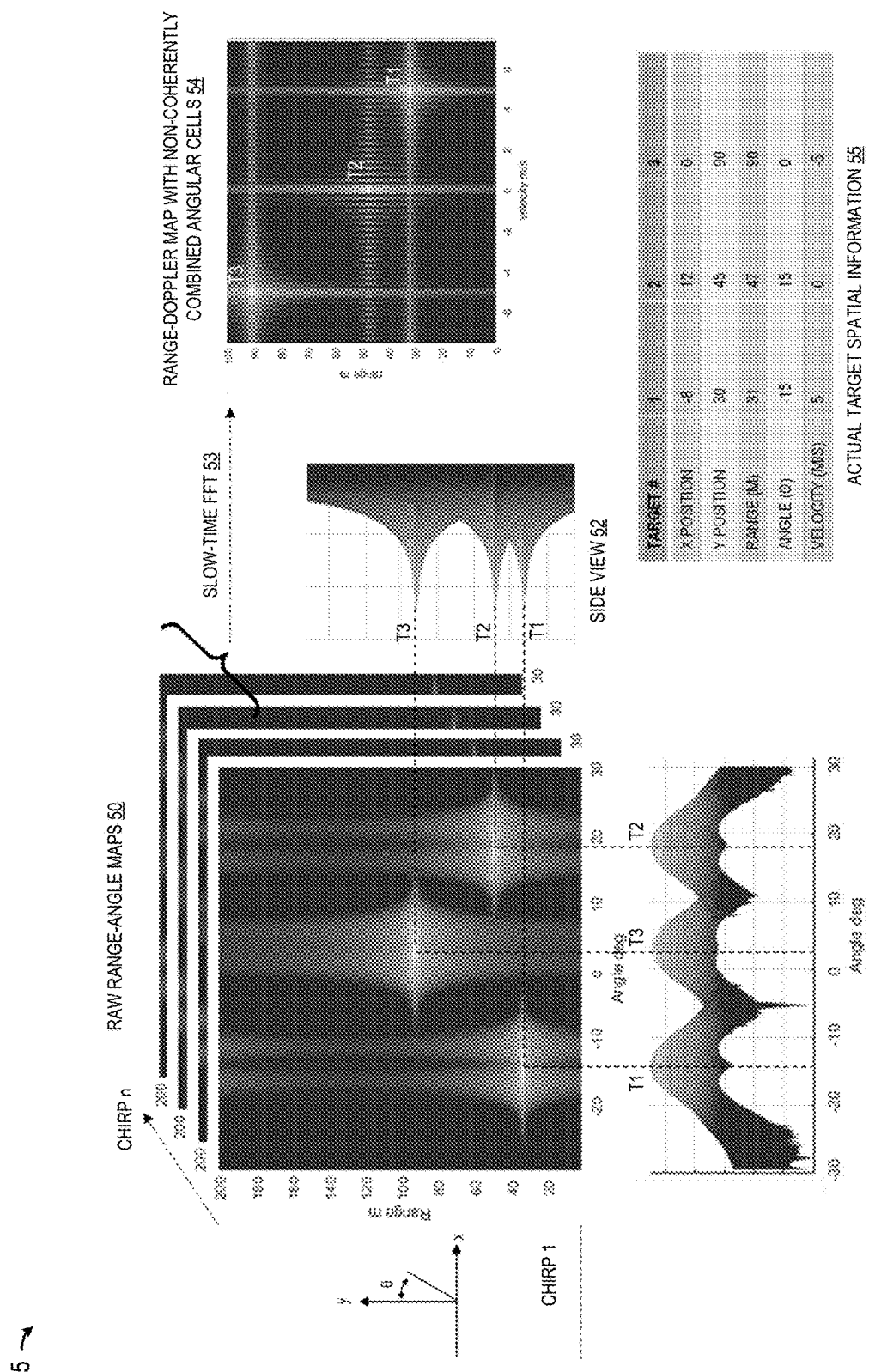
FIG. 5 depicts simulated detection results for three targets by a linear chirp radar system using a single transmit antenna and single receiving antenna formed with a frequency-scanning metamaterial antennas in accordance with selected embodiments of the present disclosure.

For an improved understanding of selected embodiments of the present disclosure, reference is now made to FIG. 5 which depicts simulated detection results 5 for three targets by a linear chirp radar system using a single transmit antenna and single receiving antenna formed with a frequency-scanning metamaterial antenna design. As illustrated, the simulation results include a raw Range-Angle map spectrogram 50, a Range-Doppler map 54 with non-coherently combined angular cells, and the actual target spatial information 55.

Each of the raw range-angle maps 50 is a spectrogram generated from a different chirp (e.g., Chirp 1, Chirp 2, ... Chirp n) by performing a time-frequency analysis (e.g., a short-time Fourier transformation) of the digital samples received from the receiver unit. In the disclosed STFT processing module or step, the short-time sampling window is designed to have a sufficient duration length that is overlapped in time to capture the entire 2Δτ worth of samples. This allows optimized range resolution to be obtainable for any targets. It is also noted that each metamaterial antenna is designed to provide a radiation pattern that has smooth roll-offs, thereby acting as natural tapering windows in the time domain so the resulting range dimension spectrum has minimized side lobe level (SLL).

In each depicted raw range-angle map or spectrogram 50, the x-axis corresponds to the time axis of the spectrogram, and is mapped to frequency and also the steering angle θ of the metamaterial antenna (prior to $\tau_r$ group delay compensation). In addition, the y-axis corresponds to the IF frequency ($f_{IF}$) which indicates the range $$r = \frac{c \times f_{IF}}{2S}$$

of the target(s), where c is the speed of light. Therefore, the target's range and angle information are recoverable from the spectrogram using a single chirp which is transmitted with at least one frequency-sweeping transmit antenna and at least one frequency-sweeping receive antenna. As disclosed herein, each spectrogram 50 conveys information as a "raw" or uncorrected range-angle map since the raw angle information obtained directly from the spectrogram contains bias due to uncompensated group delay which must be removed.

In the depicted bottom view 51 for Chirp 1, the angle dimension is depicted to show the angle response across the entire range space (e.g., 0 to 200 m). In addition, the side view 53 depicts the range dimension to show the range response across all of the angle space (e.g., −30° to 30°). In the bottom and side views, the three targets T1-T3 can be clearly identified with the peak angle and range values (e.g., T3 range=90 m, T3 angle=3°). The angle response in the bottom view 51 shows an amplitude envelope that largely follows that of the antenna's gain pattern, and the range response in the side view 53 shows the low-SLL nature indicated earlier. Doppler or velocity information can be extracted for each angle-range pixel in the spectrogram by performing FFT for each pixel position across the slow-time over all chirps 1-n. If all of the range-angle pixels are processed with the FFT process, the range-raw angle-Doppler data cube can be obtained. Range-Doppler map 54 illustrates the range-Doppler response across all angle space. Again, the three targets are clearly identifiable at the three intersection points T1, T2, T3 in the range-raw angle-Doppler data cube (as shown in range-angle maps 50 and range-Doppler map 54). The target positional information, including range, raw angle, and Doppler estimates, can be extracted from this process. However, in the directly observed raw angle estimates from the spectrogram 50, the range (related to $\tau_r$) is coupled into the raw angle estimate (related to $\tau_\theta$), such that the raw angle estimates contain a bias that needs to be removed. For example, the T3 estimated angle is 3°, instead of 0°.

In order to correct or compensate for the raw angle data in the spectrograms 50 so as to obtain unbiased estimate angle estimates, group delay compensation is applied to correct the raw range-angle map. As disclosed herein, there are a variety of suitable compensation techniques to carry out this compensation by shifting the short-time response for each spectrogram frequency (i.e., range cell). In support of these techniques, it is shown that the short time-domain group delay compensation value $\tau_r$ for different IF frequencies $f_{IF}$ follows the relationship:

$$\frac{f_{IF}}{S} = \tau_r. \quad (1)$$

From the IF frequency $f_{IF}$, a corresponding phase rotation value $\varphi_c$ may be computed as:

$$\frac{f_{IF}}{ST_c} \times 2\pi = \varphi_c \quad (2)$$

where $T_c$ is the chirp duration and the product $ST_c$ indicates the chirp bandwidth.

Based on these relationships between the phase rotation value $\varphi_c$, IF frequency $f_{IF}$, and round-trip propagation time $\tau_r$, there are a variety of compensation strategies that can be applied to remove the group compensation bias from the raw angle data generated by the short-time Fourier transformed digital samples. As described hereinbelow, these compensation strategies may be implemented by computing or obtaining, for each frequency (i.e., the y-axis or the range axis) in each spectrogram, a time shift of the short-time response (i.e., the raw angle response) by an amount of $\tau_r$ to the left. In this approach, the amount of shifting is a function of $f_{IF}$ or the y-axis position of the spectrogram. Alternatively, the time shift can be carried out in the Fourier domain by applying a per-sample phase rotation to the (inverse) Fourier transformed short-time response, based on the translating/time-shift property of Fourier transform.

Figure 6:
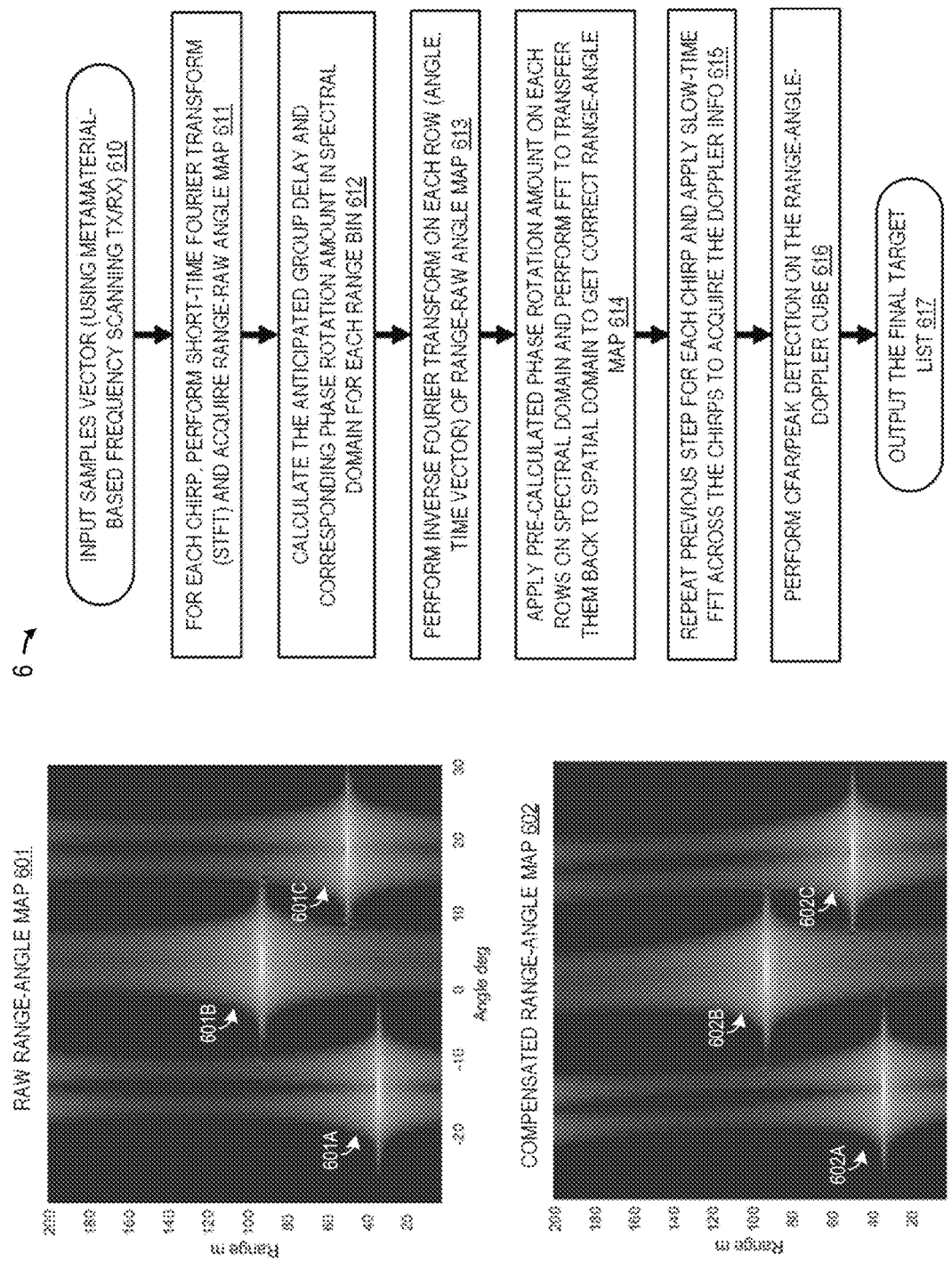
FIG. 6 depicts a raw STFT spectrogram and corrected STFT spectrogram and related flow chart showing a first chirp-sweeping method for processing of digital signals generated from linear chirp radar signals with directional sweeping transmit and receive mmW metamaterial antennas in accordance with selected embodiments of the present disclosure.

To illustrate a Fourier domain group delay compensation strategy in accordance with selected embodiments of the present disclosure, reference is now made to FIG. 6 which depicts a raw STFT spectrogram 601 and corrected STFT spectrogram 602 along with a related flow chart 6 showing a first method for chirp-sweeping processing of digital signals generated from linear chirp radar signals with directional sweeping transmit and receive mmW metamaterial antennas. The method starts (step 610) by generating an input samples vector using metamaterial-based frequency scanning TX/RX antennas. In particular, by transmitting and receiving linear chirp signals over, respectively, a frequency-sweeping metamaterial transmit antenna and a frequency-sweeping metamaterial receive antenna, the linear chirp transmit time is mapped to a beam steering angle by the frequency-sweeping TX/RX antennas. In addition, the receiver unit processes each received target return linear chirp signal into a digital input sample vector, such as by mixing each received target return linear chirp signal with the transmitted chirp signal and then converting the analog deramp mixer outputs into digital samples using an ADC which provides ADC output samples to a radar microcontroller processing unit for further processing.

At step 611, the input samples vector from each chirp are processed by performing a time-frequency analysis using a short-time Fourier transformation to acquire or produce a range-raw angle map. In FIG. 6, the raw range-angle map 601 provides an example of such a STFT spectrogram which is generated from the simulated detection results to include biased angle positions for three targets 601A-C.

At step 612, the anticipated group delay is computed along with the corresponding phase rotation amount in the spectral domain for each range bin. In selected embodiments, the computation at step 612 estimates the required group delay compensation value $\tau_r$ for each IF frequency/range cell using equation (3):

$$\frac{f_{IF}}{S} = \tau_r \quad (3)$$

At step 613, an inverse FFT (IFFT) is performed on each row (angle, time vector) of the range-raw angle map. As a result of the IFFT processing, the time or raw angle response for each range bin (i.e., on each row of the spectrogram or raw range-angle map) is converted into the Fourier domain.

At step 614, the pre-calculated phase rotation or progressive phase shift amount $\varphi_c$ is applied to each row of the spectral domain or range-raw angle map before applying an FFT process to transfer the converted row data vector back to the spatial domain to obtain a corrected range-angle map. In selected embodiments, the phase rotation amount $\varphi_c$ is calculated using equation (4):

$$\frac{\tau_r}{T_c} \times 2\pi = \varphi_c, \quad (4)$$

where Tc is the chirp duration time. After applying the phase rotation or progressive phase shift amount $\varphi_c$ to the converted row data vector, the resulting short-time response indicates the correct (unbiased) angle spectrum which is converted by the FFT back to the short time or angle domain. In FIG. 6, the compensated or corrected range-angle map 602 provides an example of such a corrected range-angle spectrogram which is generated using Fourier domain group delay compensation to include compensated angle positions for the entire spectrogram, including the three targets 602A-C. As illustrated in the compensated or corrected range-angle map 602, the application of the phase rotation amount $\varphi_c$ at each frequency (i.e., the y-axis or the range axis) position results in corrected angle values that are progressively shifted further to the left at larger range values, resulting in the corrected spectrogram 602 where the angle values are continuously shifted or slanted to the left as the range values increase.

At step 615, the processing at step 614 is repeated for each linear chirp signal to generate a plurality of corrected STFT spectrograms, thereby accumulating corrected range-angle maps over multiple chirps to form a range-angle-chirp data cube, one for each Rx channel. In addition, a slow-time (Doppler) FFT processing is applied across multiple chirps to obtain the Doppler information that is used to assemble the range-angle-Doppler cube.

At step 616, one or more constant false alarm rate (CFAR) detection processing steps are applied to the range-angle-Doppler cube to obtain the range-Doppler peak detections, and the resulting final target list is output at step 617.

Figure 7:
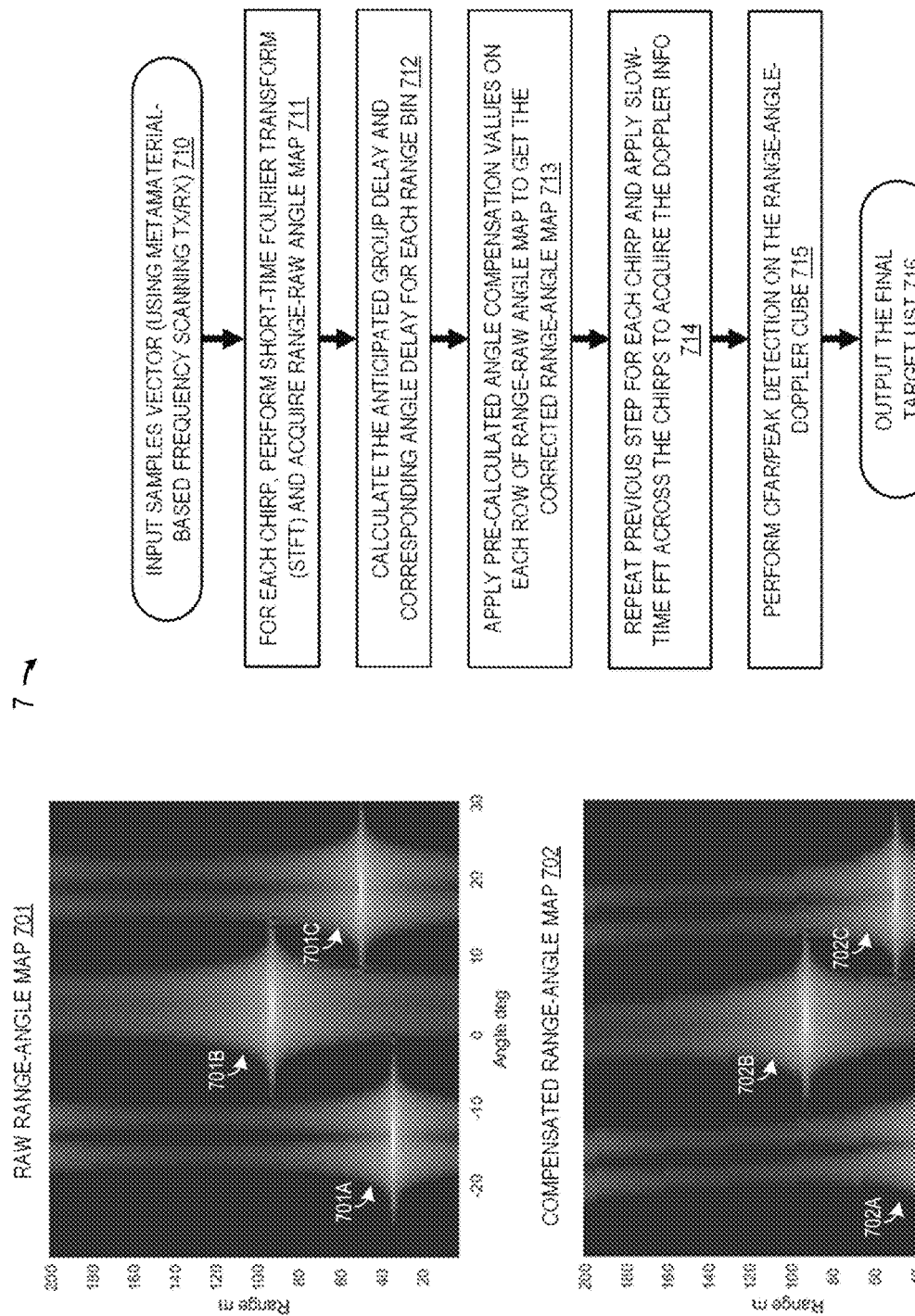
FIG. 7 depicts a raw STFT spectrogram and corrected STFT spectrogram and related flow chart showing a second method for chirp-sweeping processing of digital signals generated from linear chirp radar signals with directional sweeping transmit and receive mmW metamaterial antennas in accordance with selected embodiments of the present disclosure.

To illustrate a sample domain group delay compensation strategy in accordance with selected embodiments of the present disclosure, reference is now made to FIG. 7 which depicts a raw STFT spectrogram 701 and corrected STFT spectrogram 702 along with a related flow chart 7 showing a second method for chirp-sweeping processing of digital signals generated from linear chirp radar signals with directional sweeping transmit and receive mmW metamaterial antennas. The method starts (step 710) by generating an input samples vector using metamaterial-based frequency scanning TX/RX antennas to transmit and receive linear chirp signals so that the linear chirp transmit time is mapped to a beam steering angle by the frequency-sweeping TX/RX antennas, and then processing each received target return linear chirp signal into a digital input sample vector, such as by using the steps described above with reference to step 610.

At step 711, the input samples vector from each chirp are processed by performing a time-frequency analysis using a short-time Fourier transformation to acquire or produce a range-raw angle map. In FIG. 7, the raw range-angle map 701 provides an example of such a STFT spectrogram which is generated from the simulated detection results to include biased angle positions for three targets 701A-C.

At step 712, the anticipated group delay is computed along with the corresponding angle delay for each range bin. In selected embodiments, the computation at step 712 estimates the required group delay compensation value $\tau_r$ for each IF frequency/range cell using equation (3). In selected embodiments, the angle compensation/correction $\tau_{ind}$ is obtained by shifting the short-time response of the spectrogram by an integer value based on the calculated group delay compensation value Tr. For example, the shifting may be done by calculating integer multiples of the short time-axis bins and the amount of quantized shift, find according to equation (5).

$$\text{round}\left(\frac{\tau_r}{T_c} \times N_{win}\right) = \tau_{ind} \quad (5)$$

where $N_{win}$ is the window index (short-time bin index) of the spectrogram. For example, if the result of the "rounding" computation of $$\frac{\tau_r}{T_c} \times N_{win}$$

is 1.1, then $\tau_{ind}$ will be selected as 1, but if the result of the "rounding" computation of $$\frac{\tau_r}{T_c} \times N_{win}$$

is 1.9, then $\tau_{ind}$ will be chosen as 2.

At step 713, the pre-calculated angle compensation values $\tau_{ind}$ are applied on each row of the spectral domain or range-raw angle map to obtain a corrected range-angle map. After applying the angle compensation values to the converted row data vector in the sample domain, the resulting short-time response indicates that quantized shift corrections have been applied to the angle spectrum. In FIG. 7, the compensated or corrected range-angle map 702 provides an example of such a corrected range-angle spectrogram which is generated using sample domain group delay compensation to include compensated angle positions for three targets 702A-C that are generated using quantized shift corrections. As illustrated in the compensated or corrected range-angle map 702, the application of the angle compensation values using quantized shift corrections at each frequency (i.e., the y-axis or the range axis) position results in corrected angle values that are shifted further to the left in blocks of increasing range values, resulting in the corrected spectrogram 702 where the integer-based computation of the angle correction values results in discontinuous blocks of corrected angle values which shift or slant to the left as the range values increase.

At step 714, the processing at step 713 is repeated for each linear chirp signal to generate a plurality of corrected STFT spectrograms, thereby accumulating corrected range-angle maps over multiple chirps to form a range-angle-chirp data cube, one for each Rx channel. In addition, a slow-time (Doppler) FFT processing is applied across multiple chirps to obtain the Doppler information that is used to assemble the range-angle-Doppler cube.

At step 715, one or more constant false alarm rate (CFAR) detection processing steps are applied to the range-angle-Doppler cube to obtain the range-Doppler peak detections, and the resulting final target list is output at step 716.

As seen from the foregoing, it will be appreciated that the Fourier domain group delay compensation method (steps 610-617) provides higher accuracy, but at the cost of requiring more computational processing than the sample domain group delay compensation method (steps 710-716) which requires less computation but results in lower accuracy due to the use of quantized shifts to correct the raw angle data. However, both the Fourier domain and sample domain group delay compensation methods use computational resources to correct raw angle data that is not pertinent to target detections. For example, the computational processing to compensate for bias in the raw range-angle map 801 will include processing of spectrogram data in the area defined by the angle space (−30° to −30°) and range space (0 m to 200 m), but since there are no targets in this space, such computational processing is not useful.

To conserve computational resources when providing group delay compensation, there are a variety of compensation strategies that can be applied by first detecting range-angle peaks before removing the group compensation bias from the raw angle data. As described hereinbelow, these compensation strategies may be implemented by first using CFAR, noise threshold detection, peak detection, or any combination thereof to identify range bins that contain target detections, and then computing or obtaining, for each target detection frequency in the spectrogram, a time shift of the short-time response (i.e., the raw angle response) by an amount of $\tau_r$ to the left. In this approach, the amount of shifting applied to the detection cell(s) is a function of $f_{IF}$ or the y-axis position of the spectrogram. Alternatively, the time shift can be carried out in the Fourier domain by applying a per-sample phase rotation to the (inverse) Fourier transformed short-time response for the detection cell(s), based on the translating/time-shift property of Fourier transform.

Figure 8:
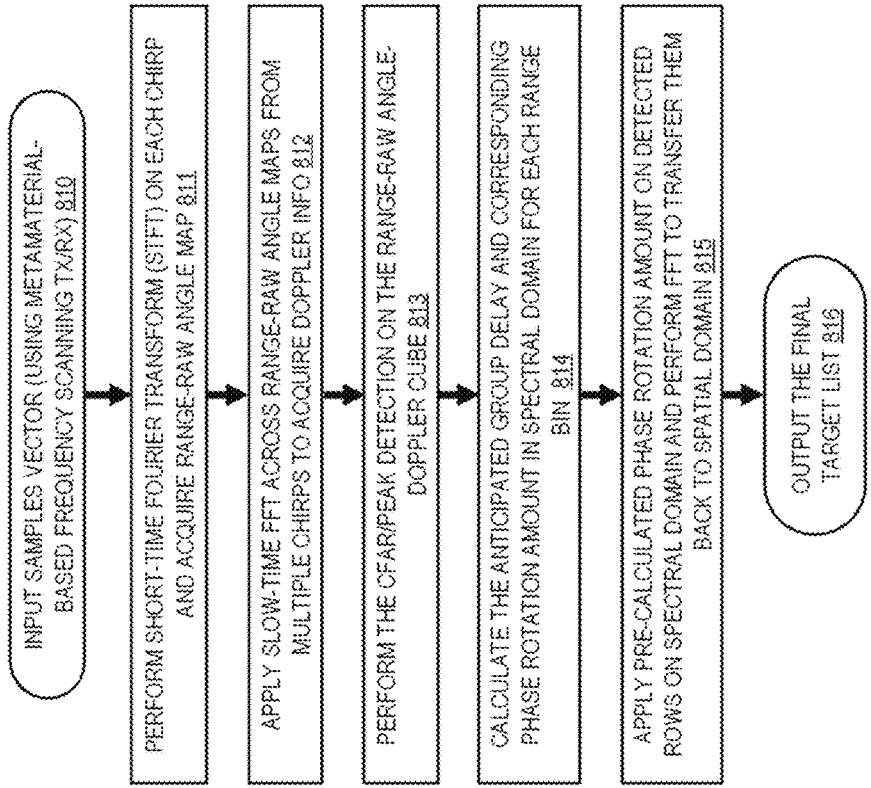
FIG. 8 depicts a raw STFT spectrogram and corrected STFT spectrogram and related flow chart showing a third method for chirp-sweeping processing of digital signals generated from linear chirp radar signals with directional sweeping transmit and receive mmW metamaterial antennas in accordance with selected embodiments of the present disclosure.
Figure 8:
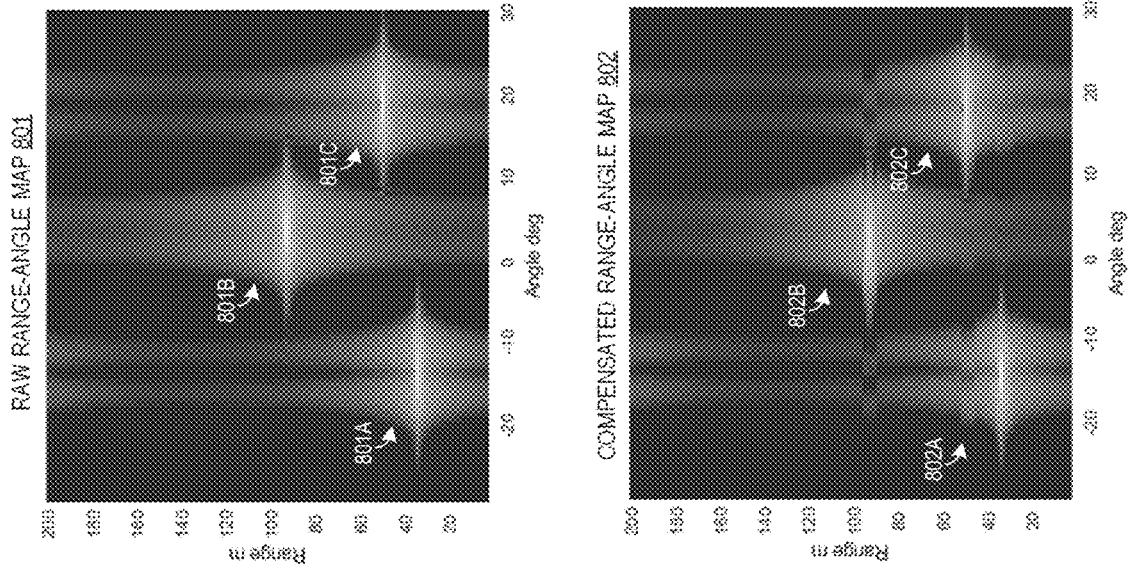

To illustrate a detection-only Fourier domain group delay compensation strategy in accordance with selected embodiments of the present disclosure, reference is now made to FIG. 8 which depicts a raw STFT spectrogram 801 and corrected STFT spectrogram 802 along with a related flow chart 8 showing a third method for chirp-sweeping processing of digital signals generated from linear chirp radar signals with directional sweeping transmit and receive mmW metamaterial antennas. The method starts (step 810) by generating an input samples vector using metamaterial-based frequency scanning TX/RX antennas to transmit and receive linear chirp signals so that the linear chirp transmit time is mapped to a beam steering angle by the frequency-sweeping TX/RX antennas, and then processing each received target return linear chirp signal into a digital input sample vector, such as by using the steps described above with reference to step 610.

At step 811, the input samples vector from each chirp are processed by performing a time-frequency analysis using a short-time Fourier transformation to acquire or produce a range-raw angle map. In FIG. 8, the raw range-angle map 801 provides an example of such a corrected range-angle spectrogram which is generated from the simulated detection results to include biased angle positions for three targets 801A-C.

At step 812, a slow-time (Doppler) FFT processing is applied across multiple range-raw angle maps generated at step 811 from multiple chirps to obtain the Doppler information that is used to assemble the range-raw angle-Doppler cube, one for each Rx channel.

At step 813, one or more constant false alarm rate (CFAR) detection processing steps are applied to the range-raw angle-Doppler cube to obtain the range-raw angle-Doppler peak detections. As will be appreciated, any suitable target technique may be used to identify range bins from the range-raw angle-Doppler cube that contain detections, including but not limited to CFAR, noise threshold detection, peak detection, or any combination thereof. In this way, the detection step 813 identifies the row of range values which contains one or more target peaks and which are to be processed for group delay compensation in the following steps.

At step 814, the anticipated group delay is calculated along with the corresponding phase rotation amount $\varphi_c$ in the spectral domain for the range bins that contain detections. In selected embodiments, the computation at step 814 estimates the required group delay compensation value $\tau_r$ for each IF frequency/range cell using equation (3), and computes the corresponding phase rotation amount $\varphi_c$ using equation (4).

At step 815, the pre-calculated phase rotation or progressive phase shift amount $\varphi_c$ is applied to each "detection" row of the spectral domain or range-raw angle map which contains one or more target peaks before applying an FFT process to transfer the converted row data vector back to the spatial domain to obtain a corrected range-angle-Doppler map. After applying the phase rotation or progressive phase shift amount $\varphi_c$ to only the "detection" row(s) of the spectral domain or range-raw angle map, the resulting compensated or corrected range-angle map 802 provides an example of a corrected range-angle spectrogram which is generated using detection-only Fourier domain group delay compensation to include compensated angle positions for three targets 802A-C. As illustrated in the compensated or corrected range-angle map 802, the application of the phase rotation amount $\varphi_c$ to only the frequency (i.e., the y-axis or the range axis) position of any "detection" row results in corrected angle values that are progressively shifted further to the left at larger range values, resulting in the corrected spectrogram 802 where only the angle values for range bins containing target detections are shifted or slanted to the left as the range values increase.

At step 816, the resulting final target list is output.

Figure 9:
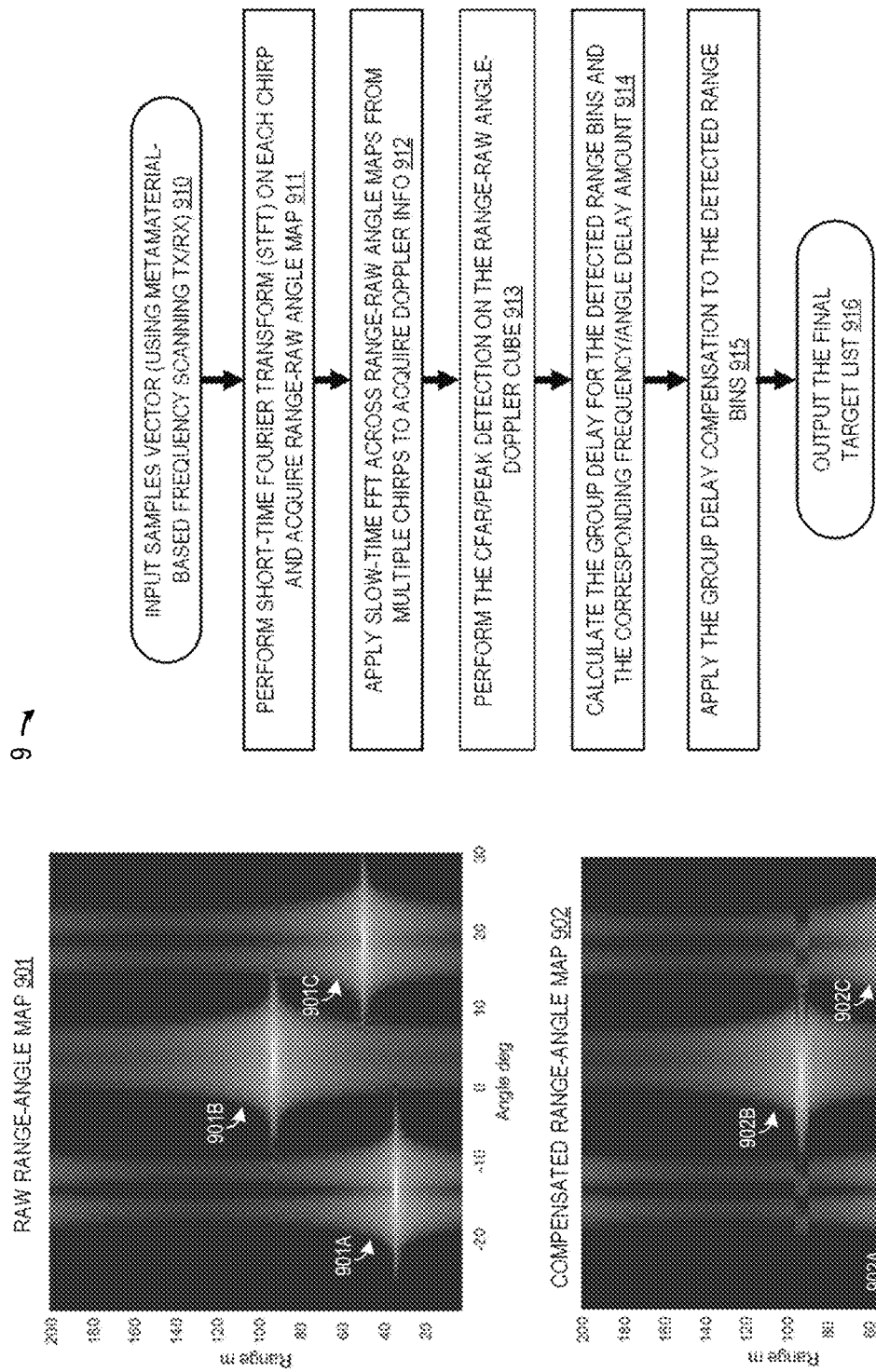
FIG. 9 depicts a raw STFT spectrogram and corrected STFT spectrogram and related flow chart showing a fourth method for chirp-sweeping processing of digital signals generated from linear chirp radar signals with directional sweeping transmit and receive mmW metamaterial antennas in accordance with selected embodiments of the present disclosure.

To illustrate a detection-only sample domain group delay compensation strategy in accordance with selected embodiments of the present disclosure, reference is now made to FIG. 9 which depicts a raw STFT spectrogram 901 and corrected STFT spectrogram 902 along with a related flow chart 9 showing a fourth method for chirp-sweeping processing of digital signals generated from linear chirp radar signals with directional sweeping transmit and receive mmW metamaterial antennas. The method starts (step 910) by generating an input samples vector using metamaterial-based frequency scanning TX/RX antennas to transmit and receive linear chirp signals so that the linear chirp transmit time is mapped to a beam steering angle by the frequency-sweeping TX/RX antennas, and then processing each received target return linear chirp signal into a digital input sample vector, such as by using the steps described above with reference to step 610.

At step 911, the input samples vector from each chirp are processed by performing a time-frequency analysis using a short-time Fourier transformation to acquire or produce a range-raw angle map. In FIG. 9, the raw range-angle map 901 provides an example of such a STFT spectrogram which is generated from the simulated detection results to include biased angle positions for three targets 901A-C.

At step 912, a slow-time (Doppler) FFT processing is applied across multiple range-raw angle maps generated at step 911 from multiple chirps to obtain the Doppler information that is used to assemble the range-raw angle-Doppler cube, one for each Rx channel.

At step 913, one or more constant false alarm rate (CFAR) detection processing steps are applied to the range-raw angle-Doppler cube to obtain the range-raw angle-Doppler peak detections. As will be appreciated, any suitable target technique may be used to identify range bins from the range-raw angle-Doppler cube that contain detections, including but not limited to CFAR, noise threshold detection, peak detection, or any combination thereof. In this way, the detection step 913 identifies the row of range values which contains one or more target peaks and which are to be processed for group delay compensation in the following steps.

At step 914, the anticipated group delay is calculated along with the corresponding frequency/angle delay amount for the range bins that contain detections. In selected embodiments, the computation at step 814 estimates the required group delay compensation value $\tau_r$ for each IF frequency/range cell using equation (3). In selected embodiments, the angle compensation correction $\tau_{ind}$ is obtained by shifting the short-time response of the spectrogram by an integer value based on the calculated group delay compensation value Tr. For example, the shifting may be done by calculating integer multiples of the short time-axis bins and the amount of quantized shift, $\tau_{ind}$ according to rounding equation (5).

At step 915, the pre-calculated group delay compensation values T ind are applied to the detected range bins for each row of range values in the range-raw angle-Doppler cube which contains one or more target peaks to generate a corrected range-angle-Doppler cube.

After applying the group delay compensation values to each "detection" row of the spectral domain or range-raw angle-Doppler map which contains one or more target peaks, the resulting corrected range-angle-Doppler cube includes quantized shift corrections to the angle spectrum. In FIG. 9, the compensated or corrected range-angle map 902 provides an example of a corrected range-angle spectrogram which is generated using detection-only sample domain group delay compensation to include compensated angle positions for three targets 902A-C that are generated using quantized shift corrections. As illustrated in the compensated or corrected range-angle map 902, the application of the angle compensation values to only the detection target rows using quantized shift corrections at each frequency (i.e., the y-axis or the range axis) position results in corrected angle values that are shifted further to the left in blocks of increasing range values, resulting in the corrected spectrogram 902 where the integer-based computation of the angle correction values results in discontinuous blocks of corrected angle values which shift or slant to the left as the range values increase.

At step 916, the resulting final target list is output.

As will be appreciated, the Fourier domain or sampling domain group delay compensation techniques may consume significant computational resources, even when using only the detection-based group delay compensation techniques disclosed here. As an alternative to "real time" group delay compensation processing, data domain group delay compensation processing may be implemented by pre-tabulating or pre-computing the amount of compensation needed to be applied to each spectrogram pixel (or cell) based on calibrated antenna measurements for storage in a compensation table in the system memory. In selected embodiments, the data domain group delay compensation processing may be performed after generating a raw range-angle-Doppler cube and applying a CFAR detection process to identify detection cells, but before reporting the final positional information (e.g., target range, angle, and velocity). In particular, the data domain group delay compensation processing approach may retrieve pre-computed angle compensation values from a table of pre-computed compensation values based on the range and raw angle information, and then apply the retrieved pre-computed angle compensation values to correct the positional information from the raw range-angle-Doppler cube and construct a target list for reporting that includes corrected positional information. As an alternative to using a table of pre-computed angle compensation values, compensated angle values can be stored instead which simplifies the process further. For example, if the target range and raw angle information indicates, respectively, the 5th range bin and the 10th angle bin, then a table lookup operation would use the values 5 and 10 as indices to retrieve the compensated angle value from the corresponding table entry and report the correct angle value.

Figure 10:
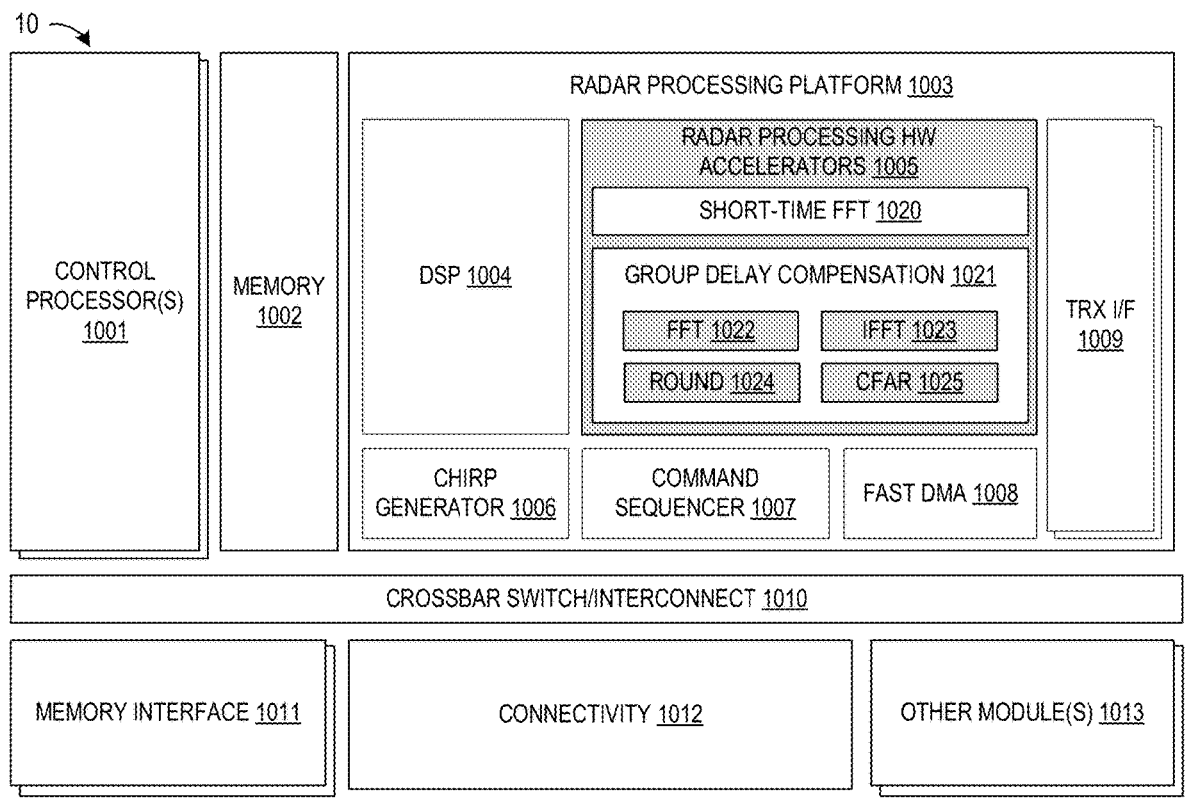
FIG. 10 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 10 which illustrates a simplified architectural block diagram of a microcontroller system 10 for automotive and industrial high-performance radar applications which may implement the disclosed linear chirp automotive radar system, apparatus, and methodology for obtaining high-quality angular information on one or more targets by using frequency scanning transmit and receive antennas configured for directional beam steering to recover both range and angle information from a single radar chirp signal using defined group delay-compensated time-frequency analysis techniques. As depicted, the microcontroller system 10 includes one or more control processor or central processing unit (CPU) subsystems 1001, on-chip memory 1002 (e.g., volatile or non-volatile memory), and radar processing platform 1003 for providing radar-specific high throughput signal processing. For example, the radar processing platform 1003 may include one or more digital signal processor (DSP) cores 1004, one or more radar processing hardware accelerators 1005, a chirp generator 1006, a command sequencer 1007, fast direct memory access (DMA) unit 1008, and a transceiver interface 1009 to provide transmit and receive module control and processing. The processor(s) 1001, on-chip memory 1002, and radar processing platform 1003 may be connected over an on-chip interconnect 1010 to a memory interface 1011, (e.g., DDR interface), one or more connectivity modules 1012 (e.g., PCIe 2x, FlexPWM, eTimer, IIC, DSPI, etc.), and other modules 1013. In selected embodiments, the microcontroller system 10 may be implemented as circuitry on a single integrated circuit or system-on-chip (SoC). In addition, the interconnect 1010 can be any type of bus structure, including but not limited to a non-coherent interconnect, an advanced high-performance bus (AHB), or an advanced peripheral bus (APB). In addition, the control processor(s) 1001 may be any type of processing circuit, including but not limited to a microprocessor (MPU), microcontroller (MCU), digital signal processor (DSP), or another type of processor or processor core with multiple levels of cache memory. Though not shown, the microcontroller system 10 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller system 10 may use the control processor(s) 601 to provide a signal processing toolbox (SPT) which receives digital output signals from the radar processing platform 1003 which uses the modules 1004-1009 to process received radar return signals by applying signal conditioning (e.g., low noise amplification, low/high pass filtering, and analog-to-digital conversion) and signal analysis (e.g., gain, windowing, FFT, and filtering). The resulting digital output signals are then processed by the control processor(s) 1001 for detection and tracking to detect one or more targets. In particular, the control processor(s) 1001 may execute control code instructions and/or hardware for performing short-time FFT 1020 on digital samples of the received and de-ramp-mixed chirp signals to extract range-raw angle information. In addition, the control processor(s) 1001 may execute control code instructions and/or hardware for performing group delay compensation 1021 on the range-raw angle information to recover the target's range and disambiguated angle information from a single chirp. In performing group delay compensation 1021, one or more of the FFT hardware units 1022 may be used to perform slow-time FFT processing to generate a Doppler information, followed by using the CFAR detector 1025 to detect target peak information. Either before or after detecting the target peak information, the group delay compensation processing/hardware 1021 may use one or more of the FFT hardware units 1022, IFFT hardware units 1023 and/or rounding units 1024 to recover the target's range and disambiguated angle information from a single chirp. For example, the group delay compensation processing/hardware 1021 may implement Fourier domain group delay compensation by using one or more of the IFFT hardware units 1023 to transform rows of the spectrogram into the spectral domain where a calculated phase rotation shift amount is applied before using one or more of the FFT hardware units 1022 to transfer the corrected results into the spatial domain to recover the target's range and disambiguated angle information. Alternatively, the group delay compensation processing/hardware 1021 may implement sample domain group delay compensation by using the rounding hardware unit 1024 to compute a quantized shift correction amount that is applied to recover the target's range and disambiguated angle information.

As disclosed herein, a radar system is provided which transmits a single linear chirp signal on a single directional sweeping transmit metamaterial antenna so that one or more target return signals received on a single directional sweeping transmit metamaterial antenna can be processed by applying time-frequency analysis processing to received signal and then applying group delay compensation techniques to extract high-quality range and angular information on one or more targets from a single linear chirp signal. By forming each of the directional sweeping transmit and receive metamaterial antennas as a stripline-based composite right/left-handed leaky wave antenna, target return signals generated from a transmitted frequency-modulated continuous wave (FMCW) radar chirp signal can be mapped to distinct range and azimuthal angles using an all passive-component based metamaterial antenna design to achieve frequency-dependent/controlled beam-steering. As a result, there are no costly and unreliable active phase shifters required to achieve beam forming/steering. In addition, there are no costly and unreliable moving parts required to achieve beam forming/steering. By using low cost, low loss directional sweeping transmit metamaterial antennas, a single radar transmit antenna and single radar receive antenna provides a more compact antenna array which is able to produce distinct range and azimuthal angles without the MIMO processing requirements and multiple transmit chirp signals as required with to multi-antenna radar systems. Another benefit from using a single TX/RX antenna configuration is that very fast refresh rates can be achieved, there improving radar detection performance.

By now it should be appreciated that there has been provided a linear chirp radar system, device, and method of operation of using frequency-scanning transmit and receive antennas to extract target range and angle information from each linear chirp signal. The disclosed radar system includes a radio-frequency (RF) transmitter unit that is connected to a single frequency-scanning transmit antenna which is configured to transmit a linear chirp signal comprising a sequence of chirp signals by sweeping a transmit energy focus across a transmit angle space with each chirp signal. In selected embodiments, the single frequency-scanning transmit antenna is a composite right/left-handed leaky wave metamaterial antenna array structure formed with a stack of dielectric layers and patterned conductive layers to provide beam steering across a predetermined transmit frequency range. The disclosed radar system also includes an RF receiver unit that is connected to a single frequency-scanning receive antenna and that is configured to generate digital output signals from one or more target return signals which include a sequence of target return chirp signals received in response to the linear chirp signal, where the single frequency-scanning receive antenna is configured to receive the one or more target return signals by sweeping a receive energy focus across a receive angle space with each target return chirp signal. In selected embodiments, the single frequency-scanning receive antenna is a composite right/left-handed leaky wave metamaterial antenna array structure formed with a stack of dielectric layers and patterned conductive layers to provide beam steering across a predetermined receive frequency range. In addition, the disclosed radar system includes a radar control processing unit connected and configured to control the RF transmitter unit and the RF receiver unit. As disclosed, the radar control processing unit is configured to extract target range-angle information from each target return chirp signal by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment. In selected embodiments, the group delay compensation processing may be applied as a Fourier domain group delay compensation process by transforming the first range-angle map into a first Fourier domain map; calculating phase rotation compensation values for each row of the first Fourier domain map; applying the phase rotation compensation values to each row of the first Fourier domain map to generate a second Fourier domain map; and transforming the second Fourier domain map into the second range-angle map. In other such embodiments, the group delay compensation processing may be applied as a sample domain group delay compensation process by calculating angle compensation values for each row of the first range-angle map and applying the angle compensation values to each row of the first range-angle map to generate the second range-angle map. In other such embodiments, the group delay compensation processing may be applied as a detection-only Fourier domain group delay compensation process by identifying any target peak detections in the first range-angle map; transforming the first range-angle map into a first Fourier domain map; calculating phase rotation compensation values for each row of the first Fourier domain map; applying the phase rotation compensation values only to one or more rows of the first Fourier domain map which correspond to the target peak detections to generate a second Fourier domain map; and transforming the second Fourier domain map into the second range-angle map. In other such embodiments, the group delay compensation processing may be applied as a detection-only sample domain group delay compensation process by identifying any target peak detections in the first range-angle map; calculating angle compensation values for each row of the first range-angle map; and applying the angle compensation values only to one or more rows of the first range-angle map which correspond to the target peak detections to generate the second range-angle map.

In another form, there is provided a method for operating a radar system and device. In the disclosed methodology, a linear chirp signal having a sequence of chirp signals is transmitted from a single frequency-scanning transmit antenna by sweeping a transmit energy focus of the single frequency-scanning transmit antenna across a transmit angle space with each chirp signal. In selected embodiments, the linear chirp signal is transmitted from the single frequency-scanning transmit antenna applying each chirp signal to a composite right/left-handed leaky wave metamaterial antenna array structure to provide beam steering across a predetermined transmit frequency range. In selected embodiments, one or more target return signals are received at a single frequency-scanning receive antenna by applying each target return chirp signal to a composite right/left-handed leaky wave metamaterial antenna array structure to provide beam steering across a predetermined receive frequency range. In addition, the disclosed methodology generates digital output signals from one or more target return signals received at the single frequency-scanning receive antenna in response to the linear chirp signal by sweeping a receive energy focus of the single frequency-scanning receive antenna across a receive angle space with each target return chirp signal. The disclosed methodology also processes the digital output signals at a radar control processing unit to extract target range-angle information from each target return chirp signal by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment. In selected embodiments, the group delay compensation processing is applied as a Fourier domain group delay compensation process which includes transforming the first range-angle map into a first Fourier domain map; calculating or retrieving phase rotation compensation values for each row of the first Fourier domain map; applying the phase rotation compensation values to each row of the first Fourier domain map to generate a second Fourier domain map; and transforming the second Fourier domain map into the second range-angle map. In other selected embodiments, the group delay compensation processing is applied as a sample domain group delay compensation process by calculating or retrieving angle compensation values for each row of the first range-angle map and applying the angle compensation values to each row of the first range-angle map to generate the second range-angle map. In other selected embodiments, the group delay compensation processing is applied as a detection-only Fourier domain group delay compensation process which includes identifying any target peak detections in the first range-angle map; transforming the first range-angle map into a first Fourier domain map; calculating or retrieving phase rotation compensation values for each row of the first Fourier domain map; applying the phase rotation compensation values only to one or more rows of the first Fourier domain map which correspond to the target peak detections to generate a second Fourier domain map; and transforming the second Fourier domain map into the second range-angle map. In other selected embodiments, the group delay compensation processing is applied as a detection-only sample domain group delay compensation process which includes identifying any target peak detections in the first range-angle map; calculating or retrieving angle compensation values for each row of the first range-angle map; and applying the angle compensation values only to one or more rows of the first range-angle map which correspond to the target peak detections to generate the second range-angle map.

In yet another form, there is provided a radar apparatus and associated method of operation. In the disclosed radar apparatus, a transmitter is configured to transmit a sequence of linear chirp signals from a single frequency-scanning transmit antenna at a radio-frequency (RF) transmitter unit by sweeping a transmit energy focus of the single frequency-scanning transmit antenna across a transmit angle space with each chirp signal. The radar apparatus also includes a receiver configured to produce digital output signals from one or more target return signals received in response to the sequence of linear chirp signals. In selected embodiments, each of the single frequency-scanning transmit and receiving antennas may be embodied as a composite right/left-handed leaky wave metamaterial antenna array structure formed with a stack of dielectric layers and patterned conductive layers to provide beam steering across a predetermined frequency range. In addition, the radar apparatus includes a digital signal processor configured to process the digital output signals to extract target range-angle information by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment. In selected embodiments, the digital signal processor is configured to apply a Fourier domain group delay compensation process by transforming the first range-angle map into a first Fourier domain map; calculating or retrieving phase rotation compensation values for each row of the first Fourier domain map; applying the phase rotation compensation values to each row of the first Fourier domain map to generate a second Fourier domain map; and transforming the second Fourier domain map into the second range-angle map. In other selected embodiments, the digital signal processor is configured to apply a sample domain group delay compensation process by calculating or retrieving angle compensation values for each row of the first range-angle map and applying the angle compensation values to each row of the first range-angle map to generate the second range-angle map. In other selected embodiments, the digital signal processor is configured to apply a detection-only Fourier domain group delay compensation process by identifying any target peak detections in the first range-angle map; transforming the first range-angle map into a first Fourier domain map; calculating or retrieving phase rotation compensation values for each row of the first Fourier domain map; applying the phase rotation compensation values only to one or more rows of the first Fourier domain map which correspond to the target peak detections to generate a second Fourier domain map; and transforming the second Fourier domain map into the second range-angle map. In other selected embodiments, the digital signal processor is configured to apply a detection-only sample domain group delay compensation process by identifying any target peak detections in the first range-angle map; calculating or retrieving angle compensation values for each row of the first range-angle map; and applying the angle compensation values only to one or more rows of the first range-angle map which correspond to the target peak detections to generate the second range-angle map.

Although the described exemplary embodiments disclosed herein focus on example automotive radar circuits, systems, and methods for using same, the present invention is not necessarily limited to the example embodiments illustrate herein. For example, various embodiments of the linear chirp automotive radar system may use a plurality of millimeter wave metamaterial transmit antennas and a plurality of millimeter wave metamaterial receive antennas to implement MIMO-based signal processing to provide high-quality angular information on one or more targets. In addition, the disclosed chirp-sweeping (CS) processing may be applied in non-automotive radar applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system, comprising:
a radio-frequency (RF) transmitter unit connected to a single frequency-scanning transmit antenna which is configured to transmit a linear chirp signal comprising a sequence of chirp signals by sweeping a transmit energy focus across a transmit angle space with each chirp signal;
an RF receiver unit connected to a single frequency-scanning receive antenna and configured to generate digital output signals from one or more target return signals comprising a sequence of target return chirp signals received in response to the linear chirp signal, where the single frequency-scanning receive antenna is configured to receive the one or more target return signals by sweeping a receive energy focus across a receive angle space with each target return chirp signal, and wherein the single frequency-scanning receive antenna comprises a composite right/left-handed leaky wave metamaterial antenna array structure formed with a stack of dielectric layers and patterned conductive layers to provide beam steering across a predetermined receive frequency range; and
a radar control processing unit connected and configured to control the RF transmitter unit and the RF receiver unit;
wherein the radar control processing unit is configured to extract target range-angle information from each target return chirp signal by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment.

2. The radar system of claim 1, wherein the single frequency-scanning transmit antenna comprises a composite right/left-handed leaky wave metamaterial antenna array structure formed with a stack of dielectric layers and patterned conductive layers to provide beam steering across a predetermined transmit frequency range.

3. The radar system of claim 1, where applying group delay compensation processing comprises applying a Fourier domain group delay compensation process by:
transforming the first range-angle map into a first Fourier domain map;
calculating or retrieving phase rotation compensation values for each row of the first Fourier domain map;
applying the phase rotation compensation values to each row of the first Fourier domain map to generate a second Fourier domain map; and
transforming the second Fourier domain map into the second range-angle map.

4. The radar system of claim 1, where applying group delay compensation processing comprises applying a sample domain group delay compensation process by calculating or retrieving angle compensation values for each row of the first range-angle map and applying the angle compensation values to each row of the first range-angle map to generate the second range-angle map.

5. The radar system of claim 1, where applying group delay compensation processing comprises applying a detection-only Fourier domain group delay compensation process by:
identifying any target peak detections in the first range-angle map;
transforming the first range-angle map into a first Fourier domain map;
calculating or retrieving phase rotation compensation values for each row of the first Fourier domain map;
applying the phase rotation compensation values only to one or more rows of the first Fourier domain map which correspond to the target peak detections to generate a second Fourier domain map; and
transforming the second Fourier domain map into the second range-angle map.

6. The radar system of claim 1, where applying group delay compensation processing comprises applying a detection-only sample domain group delay compensation process by:
identifying any target peak detections in the first range-angle map;
calculating or retrieving angle compensation values for each row of the first range-angle map; and
applying the angle compensation values only to one or more rows of the first range-angle map which correspond to the target peak detections to generate the second range-angle map.

7. A method for operating a radar system, comprising:
transmitting, from a single frequency-scanning transmit antenna, a linear chirp signal comprising a sequence of chirp signals by sweeping a transmit energy focus of the single frequency-scanning transmit antenna across a transmit angle space with each chirp signal;
generating digital output signals from one or more target return signals received at a single frequency-scanning receive antenna in response to the linear chirp signal by sweeping a receive energy focus of the single frequency-scanning receive antenna across a receive angle space with each target return chirp signal; and
processing the digital output signals at a radar control processing unit to extract target range-angle information from each target return chirp signal by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment; and
receiving one or more target return signals at the single frequency-scanning receive antenna by applying each target return chirp signal to a composite right/left-handed leaky wave metamaterial antenna array structure to provide beam steering across a predetermined receive frequency range.

8. The method of claim 7, where transmitting the linear chirp signal from the single frequency-scanning transmit antenna comprises applying each chirp signal to a composite right/left-handed leaky wave metamaterial antenna array structure to provide beam steering across a predetermined transmit frequency range.

9. The method of claim 7, where applying group delay compensation processing comprises applying a Fourier domain group delay compensation process by:

transforming the first range-angle map into a first Fourier domain map;

calculating or retrieving phase rotation compensation values for each row of the first Fourier domain map;

applying the phase rotation compensation values to each row of the first Fourier domain map to generate a second Fourier domain map; and transforming the second Fourier domain map into the second range-angle map.

10. The method of claim 7, where applying group delay compensation processing comprises applying a sample domain group delay compensation process by calculating or retrieving angle compensation values for each row of the first range-angle map and applying the angle compensation values to each row of the first range-angle map to generate the second range-angle map.

11. The method of claim 7, where applying group delay compensation processing comprises applying a detection-only Fourier domain group delay compensation process by:

identifying any target peak detections in the first range-angle map;

transforming the first range-angle map into a first Fourier domain map;

calculating or retrieving phase rotation compensation values for each row of the first Fourier domain map;

applying the phase rotation compensation values only to one or more rows of the first Fourier domain map which correspond to the target peak detections to generate a second Fourier domain map; and transforming the second Fourier domain map into the second range-angle map.

12. The method of claim 7, where applying group delay compensation processing comprises applying a detection-only sample domain group delay compensation process by:

identifying any target peak detections in the first range-angle map;

calculating or retrieving angle compensation values for each row of the first range-angle map; and applying the angle compensation values only to one or more rows of the first range-angle map which correspond to the target peak detections to generate the second range-angle map.

13. A radar apparatus, comprising:

a transmitter configured to transmit a sequence of linear chirp signals from a single frequency-scanning transmit antenna at a radio-frequency (RF) transmitter unit by sweeping a transmit energy focus of the single frequency-scanning transmit antenna across a transmit angle space with each chirp signal, wherein the single frequency-scanning receive antenna comprises a composite right/left-handed leaky wave metamaterial antenna array structure formed with a stack of dielectric layers and patterned conductive layers to provide beam steering across a predetermined receive frequency range;

a receiver configured to produce digital output signals from one or more target return signals received in response to the sequence of linear chirp signals; and a digital signal processor configured to process the digital output signals to extract target range-angle information by applying time-frequency analysis processing to the digital output signals to generate a first range-angle map which includes range-biased angle information, and then applying a group delay compensation process to generate a second range-angle map which includes target range-angle information that is generated by selectively adjusting the range-biased angular information in the first range-angle map with an angular adjustment.

14. The radar apparatus of claim 13, wherein the single frequency-scanning transmit antenna and the single frequency-scanning receive antenna each comprise a composite right/left-handed leaky wave metamaterial antenna array structure formed with a stack of dielectric layers and patterned conductive layers to provide beam steering across a predetermined frequency range.

15. The radar apparatus of claim 13, wherein the digital signal processor is configured to apply a Fourier domain group delay compensation process by:

transforming the first range-angle map into a first Fourier domain map;

calculating or retrieving phase rotation compensation values for each row of the first Fourier domain map;

applying the phase rotation compensation values to each row of the first Fourier domain map to generate a second Fourier domain map; and transforming the second Fourier domain map into the second range-angle map.

16. The radar apparatus of claim 13, wherein the digital signal processor is configured to apply a sample domain group delay compensation process by calculating or retrieving angle compensation values for each row of the first range-angle map and applying the angle compensation values to each row of the first range-angle map to generate the second range-angle map.

17. The radar apparatus of claim 13, wherein the digital signal processor is configured to apply a detection-only Fourier domain group delay compensation process by:

identifying any target peak detections in the first range-angle map;

transforming the first range-angle map into a first Fourier domain map;

calculating or retrieving phase rotation compensation values for each row of the first Fourier domain map;

applying the phase rotation compensation values only to one or more rows of the first Fourier domain map which correspond to the target peak detections to generate a second Fourier domain map; and transforming the second Fourier domain map into the second range-angle map.

18. The radar apparatus of claim 13, wherein the digital signal processor is configured to apply a detection-only sample domain group delay compensation process by:

identifying any target peak detections in the first range-angle map;

calculating or retrieving angle compensation values for each row of the first range-angle map; and applying the angle compensation values only to one or more rows of the first range-angle map which correspond to the target peak detections to generate the second range-angle map.

* * * * *